US011758180B2

(12) United States Patent
Li et al.

(10) Patent No.: US 11,758,180 B2
(45) Date of Patent: *Sep. 12, 2023

(54) VIDEO CODING BASED ON MULTIPLE SETS OF SUBBLOCK MOTION VECTORS

(71) Applicant: Tencent America LLC, Palo Alto, CA (US)

(72) Inventors: Guichun Li, Milpitas, CA (US); Xiang Li, Saratoga, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/975,386

(22) Filed: Oct. 27, 2022

(65) Prior Publication Data

US 2023/0054988 A1 Feb. 23, 2023

Related U.S. Application Data

(63) Continuation of application No. 17/404,811, filed on Aug. 17, 2021, now Pat. No. 11,553,205, which is a
(Continued)

(51) Int. Cl.
*H04N 7/12* (2006.01)
*H04N 19/52* (2014.01)
(Continued)

(52) U.S. Cl.
CPC ........... *H04N 19/52* (2014.11); *H04N 19/105* (2014.11); *H04N 19/176* (2014.11);
(Continued)

(58) Field of Classification Search
CPC .............................. H04N 19/436; H04N 19/52
See application file for complete search history.

(56) References Cited

U.S. PATENT DOCUMENTS

| 2018/0070102 A1 | 3/2018 | Zhang et al. |
| 2018/0098063 A1 | 4/2018 | Chen et al. |

(Continued)

FOREIGN PATENT DOCUMENTS

| WO | 2017157259 A1 | 9/2017 |
| WO | 2017197146 A1 | 11/2017 |

OTHER PUBLICATIONS

Chen et al., "Algorithm description for Versatile Video Coding and Test Model 4 (VTM 4)," Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M1002-v2, 62 pages.

(Continued)

*Primary Examiner* — Young Lee
(74) *Attorney, Agent, or Firm* — ARENTFOX SCHIFF LLP

(57) ABSTRACT

Aspects of the disclosure provide a method and an apparatus for video coding. In some examples, an apparatus includes processing circuitry that determines first motion vectors for a plurality of subblocks of a current block based on a first relative position in each subblock of the plurality of subblocks, and determines second motion vectors for the plurality of subblocks based on a second relative position in each subblock of the plurality of subblocks. The processing circuitry obtains a first set of predicted samples for the current block based on the first motion vectors of the plurality of subblocks. Further, the processing circuitry obtains a second set of predicted samples for the current block based on the second motion vectors of the plurality of subblocks, and obtains a third set of predicted samples for the current block based on the first set of predicted samples and the second set of predicted samples.

18 Claims, 27 Drawing Sheets

Related U.S. Application Data continuation of application No. 16/800,867, filed on Feb. 25, 2020, now Pat. No. 11,134,262.

(60) Provisional application No. 62/812,221, filed on Feb. 28, 2019.

(51) Int. Cl.
*H04N 19/105* (2014.01)
*H04N 19/577* (2014.01)
*H04N 19/176* (2014.01)
*H04N 19/189* (2014.01)
*H04N 19/436* (2014.01)

(52) U.S. Cl.
CPC ......... *H04N 19/189* (2014.11); *H04N 19/436* (2014.11); *H04N 19/577* (2014.11)

(56) References Cited

U.S. PATENT DOCUMENTS

2019/0037231 A1   1/2019   Ikai et al.
2019/0058896 A1   2/2019   Huang et al.

OTHER PUBLICATIONS

Extended European Search Report in EP20763623.4, dated Dec. 23, 2021, 12 pages.

Hsiao et al., "CF2-related: Simplifications for inherited affine candidates," Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0168-v1, 8 pages.

International Search Report and Written Opinion in PCT/US2020/020423, dated Jun. 4, 2020, 8 pages.

|   |   |   |   |
|---|---|---|---|
| 3 | 3 | 1 | 1 |
| 3 | 3 | 1 | 1 |
| 1 | 1 | 1 | 1 |
| 1 | 1 | 1 | 1 |

|   |   |   |   |
|---|---|---|---|
| 3 | 3 | 1 | 1 |
| 3 | 3 | 1 | 1 |
| 1 | 1 | 1 | 1 |
| 1 | 1 | 1 | 1 |

|   |   |   |   |
|---|---|---|---|
| 1 | 1 | 1 | 1 |
| 1 | 1 | 1 | 1 |
| 1 | 1 | 3 | 3 |
| 1 | 1 | 3 | 3 |

|   |   |   |   |
|---|---|---|---|
| 1 | 1 | 1 | 1 |
| 1 | 1 | 1 | 1 |
| 3 | 3 | 3 | 3 |
| 3 | 3 | 3 | 3 |

|   |   |   |   |
|---|---|---|---|
| 3 | 3 | 3 | 3 |
| 3 | 3 | 3 | 3 |
| 1 | 1 | 1 | 1 |
| 1 | 1 | 1 | 1 |

VIDEO CODING BASED ON MULTIPLE SETS OF SUBBLOCK MOTION VECTORS

This application is a continuation of U.S. application Ser. No. 17/404,811, filed on Aug. 17, 2021, which claims the benefit of priority to U.S. application Ser. No. 16/800,867 (now U.S. Pat. No. 11,134,262), filed Feb. 25, 2020, and U.S. Provisional Application No. 62/812,221, "STACKED AFFINE INTER PREDICTION METHODS" filed on Feb. 28, 2019. The entire disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described herein is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five neighboring blocks, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus includes processing circuitry that obtains a plurality of control point motion vectors for a current block, the current block being divided into a plurality of sub-blocks. The processing circuitry determines first motion vectors for the plurality of sub-blocks, respectively, according to the plurality of control point motion vectors, the first motion vectors corresponding to a first relative position in each sub-block. The processing circuitry also determines second motion vectors for the plurality of sub-blocks, respectively, according to the plurality of control point motion vectors, at least one first motion vector from the first motion vectors being different from a corresponding second motion vector from the second motion vectors. The processing circuitry obtains a first set of predicted samples for the current block according to the first motion vectors and the plurality of sub-blocks, obtains a second set of predicted samples for the current block according to the second motion vectors and the plurality of sub-blocks, and obtains a third set of predicted samples for the current block based on the first set of predicted samples and the second set of predicted samples.

In some embodiments, the second motion vectors correspond to a second relative position in each sub-block, the first relative position being different from the second relative position. In one example, the first relative position is a center of each sub-block. In one example, the second relative position is a particular corner of each sub-block.

In some embodiments, the first relative position and the second relative position are symmetric with respect to one of a vertical line, a horizontal line, and a diagonal line intersecting a center of each sub-block. In some embodiments, the first relative position is a center of a left edge of each sub-block, and the second relative position is a center of a right edge of each sub-block.

In some embodiments, the second motion vectors are obtained by applying a motion vector offset to the first motion vectors.

In some embodiments, the third set of predicted samples is calculated as a weighted average of the first set of predicted samples and the second set of predicted samples. In one example, a first pixel in the first set of predicted samples for a particular sub-block is located at a first position in the sub-block and has a first weight for calculating the combination, a second pixel in the first set of predicted samples for the particular sub-block is located at a second position in the sub-block and has a second weight for calculating the combination, and the first weight is greater than the second weight, and the first position is closer to the first relative position of the sub-block than the second position.

In one example, one of the plurality of sub-blocks has a size of 4×4 pixels. In such example, a pixel in the first set of predicted samples for the one of the plurality of sub-blocks has a weight of three over a total weight of four when the pixel is located less than three pixels away from the first relative position along a horizontal direction or a vertical direction, and a weight of one over the total weight of four when the pixel is located three or more pixels away from the first relative position along the horizontal direction or the vertical direction.

In one example, weights for calculating the weighted average for a particular sub-block are derived according to a generalized bi-prediction (GBi) index for the particular sub-block.

In some embodiments, the current block is a uni-predicted block. In some embodiments, a de-blocking process is not performed on the current block.

In some embodiments, the processing circuitry also determines whether a stacked affine mode is enabled in a coding region of a particular level according to a flag signaled at the particular level, where the current block is included in the coding region of the particular level. The particular level can correspond to one of a slice, title, title-group, picture, and sequence level. The determining the second motion vectors for the plurality of sub-blocks and the obtaining the second set of predicted samples for the current block can be performed when the stacked affine mode is enabled. The determining the second motion vectors for the plurality of sub-blocks and the obtaining the second set of predicted samples for the current block can be not performed when the stacked affine mode is not enabled. In one example, when the flag that is applicable to the coding region indicates that the stacked affine mode is enabled, the determining the second motion vectors for the plurality of sub-blocks and the obtaining the second set of predicted samples for the current block are not performed on any bi-predicted block in the coding region.

Aspects of the disclosure also provide a non-transitory computer-readable medium storing instructions which when executed by a computer for video decoding cause the computer to perform any one or a combination of the methods for video decoding.

BRIEF DESCRIPTION OF THE DRAWINGS

Further features, the nature, and various advantages of the disclosed subject matter will be more apparent from the following detailed description and the accompanying drawings in which:

FIGS. 22A-22E shows various examples of assigning weights for a sub-block in a stacked affine prediction method in accordance with one or more embodiments.

DETAILED DESCRIPTION OF EMBODIMENTS

I. Video Coding Encoder and Decoder

Figure 1:
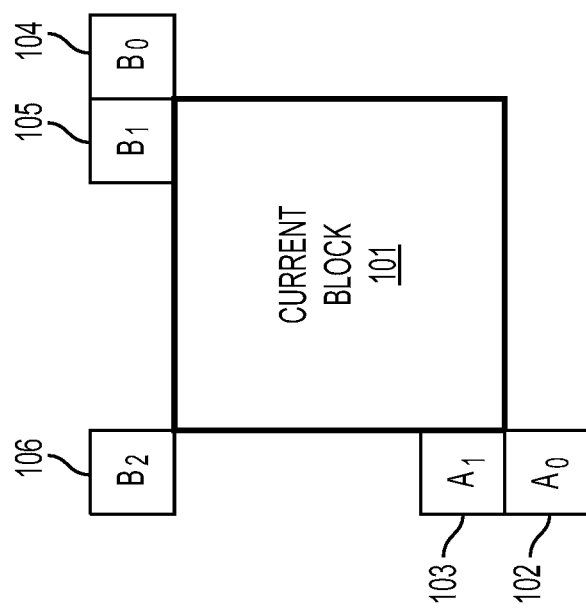
FIG. 1 is a schematic illustration of a current block and its surrounding spatial merge candidates in one example.
Figure 2:
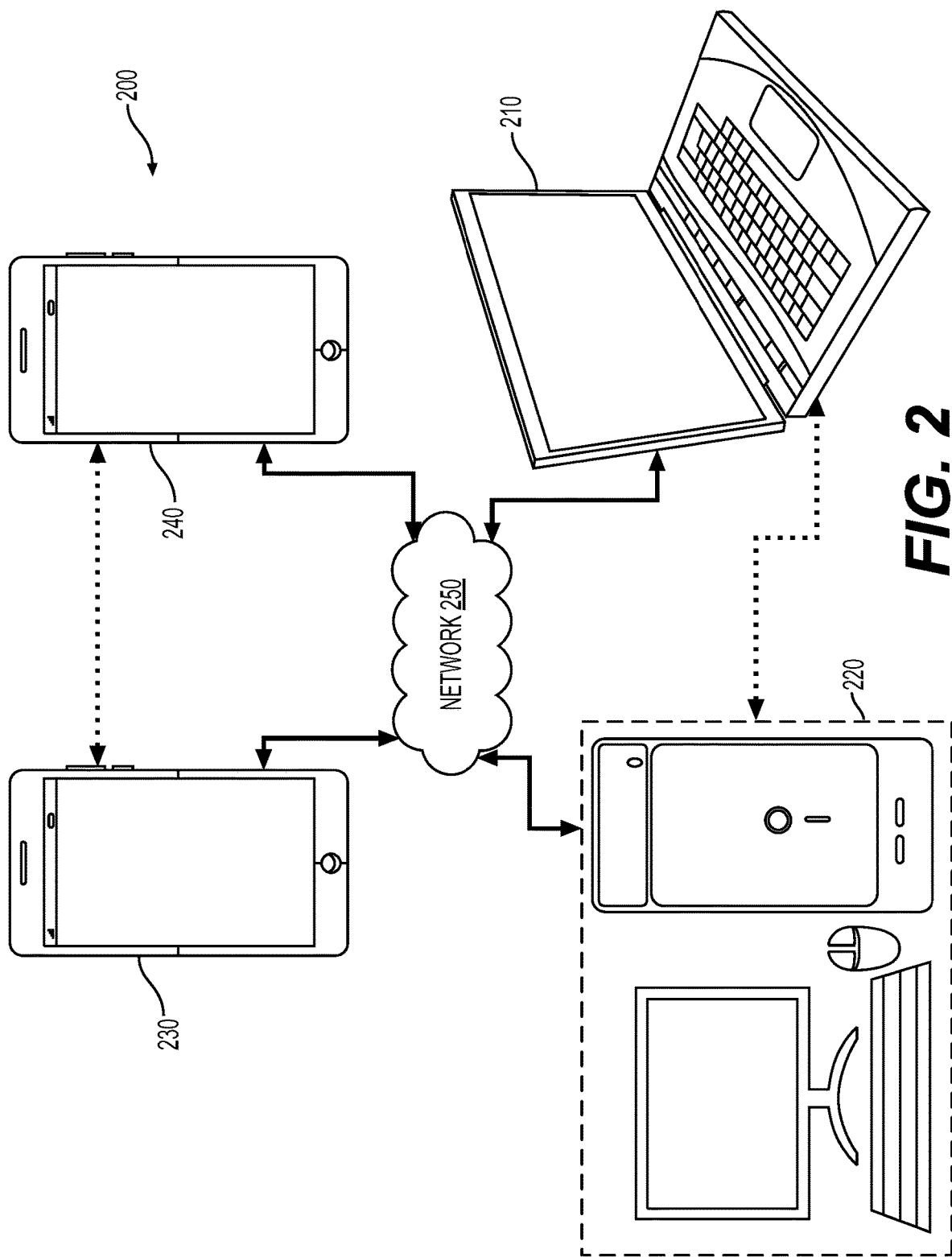
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures, and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230), and (240) may be illustrated as servers, personal computers, and smart phones, but the principles of the present disclosure may be not so limited. Embodiments of the present disclosure find application with laptop computers, tablet computers, media players, and/or dedicated video conferencing equipment. The network (250) represents any number of networks that convey coded video data among the terminal devices (210), (220), (230), and (240), including for example wireline (wired) and/or wireless communication networks. The communication network (250) may exchange data in circuit-switched and/or packet-switched channels. Representative networks include telecommunications networks, local area networks, wide area networks, and/or the Internet. For the purposes of the present discussion, the architecture and topology of the network (250) may be immaterial to the operation of the present disclosure unless explained herein below.

Figure 3:
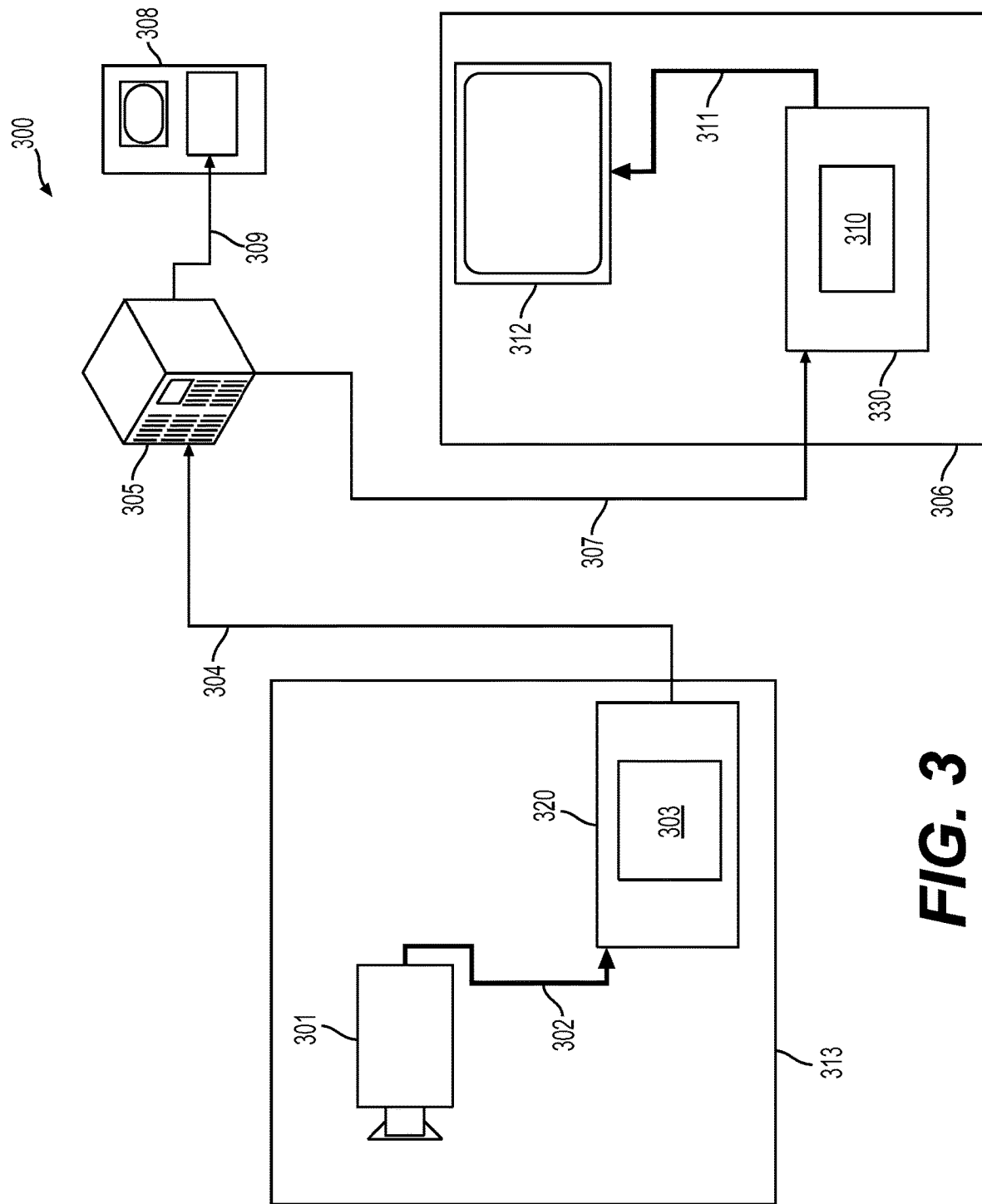
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313) that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3, can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
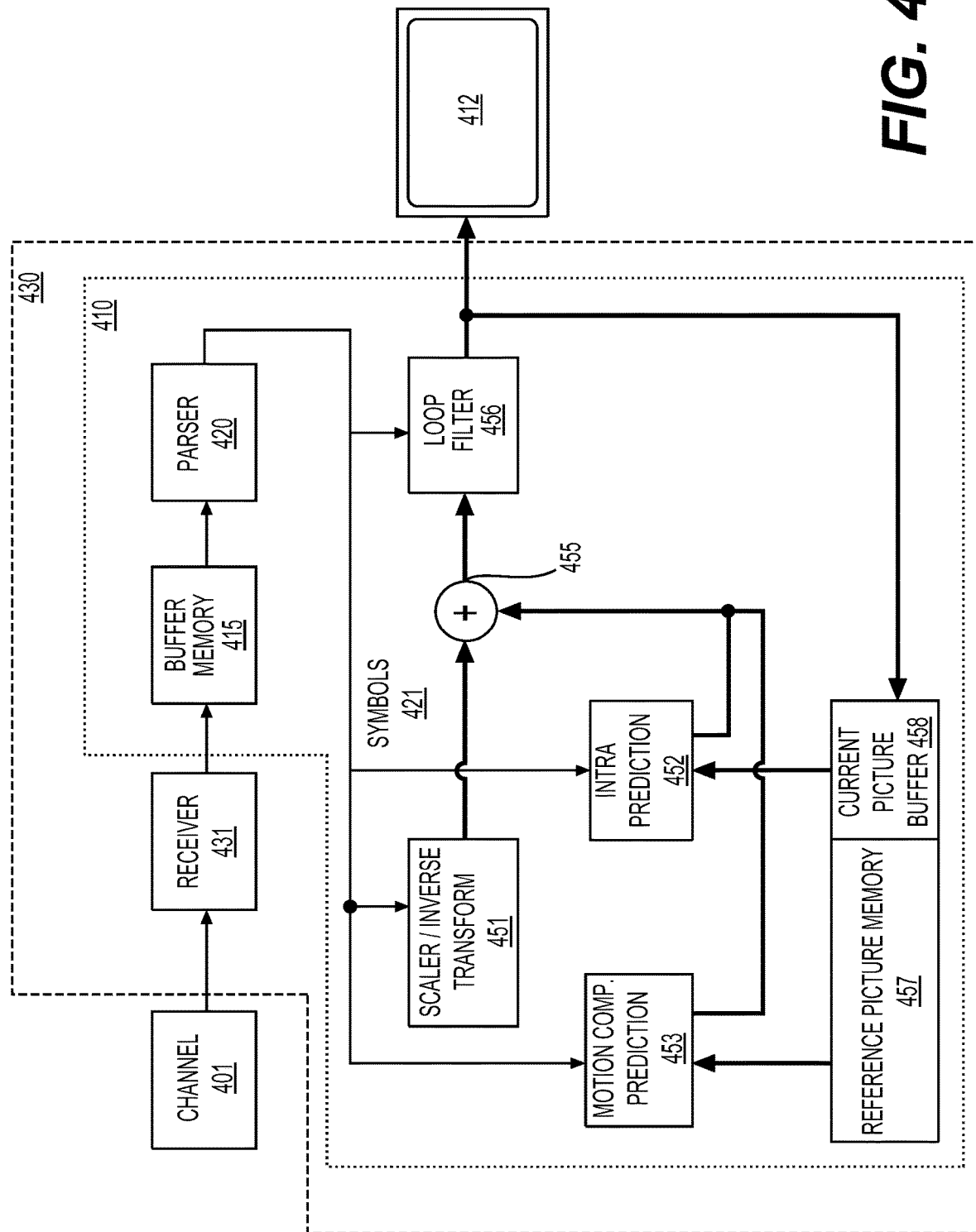
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example mega samples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
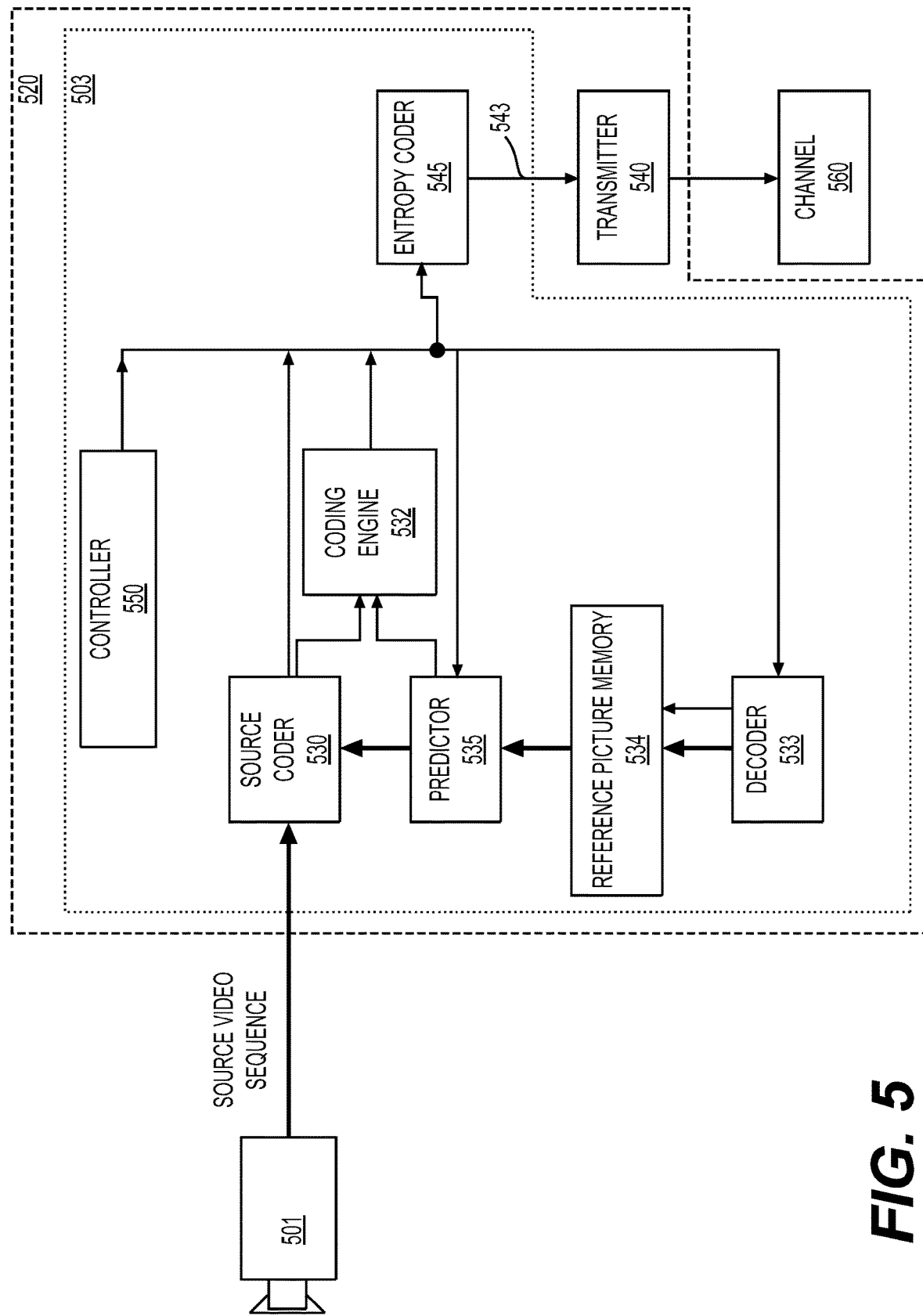
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any color space (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
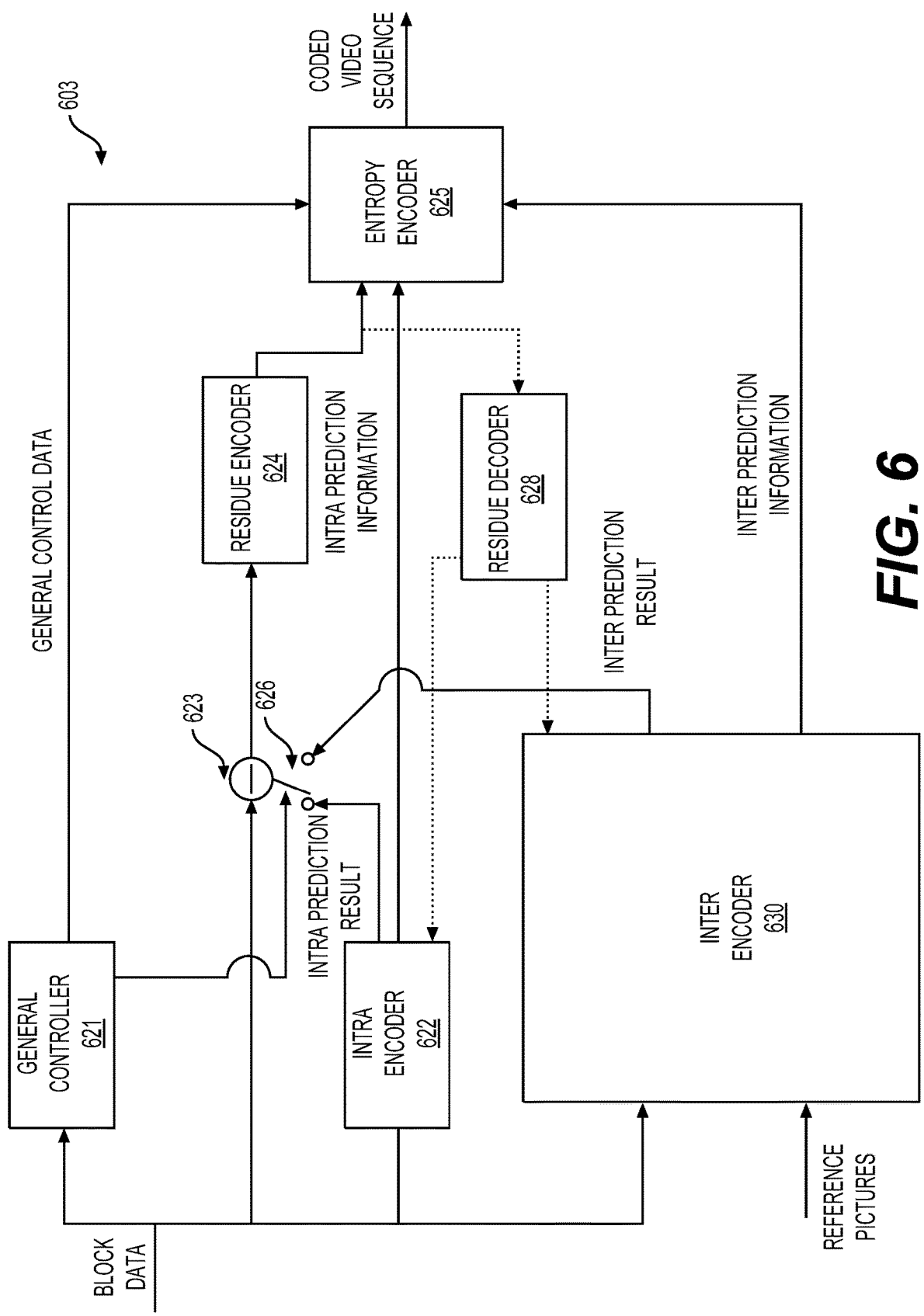
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
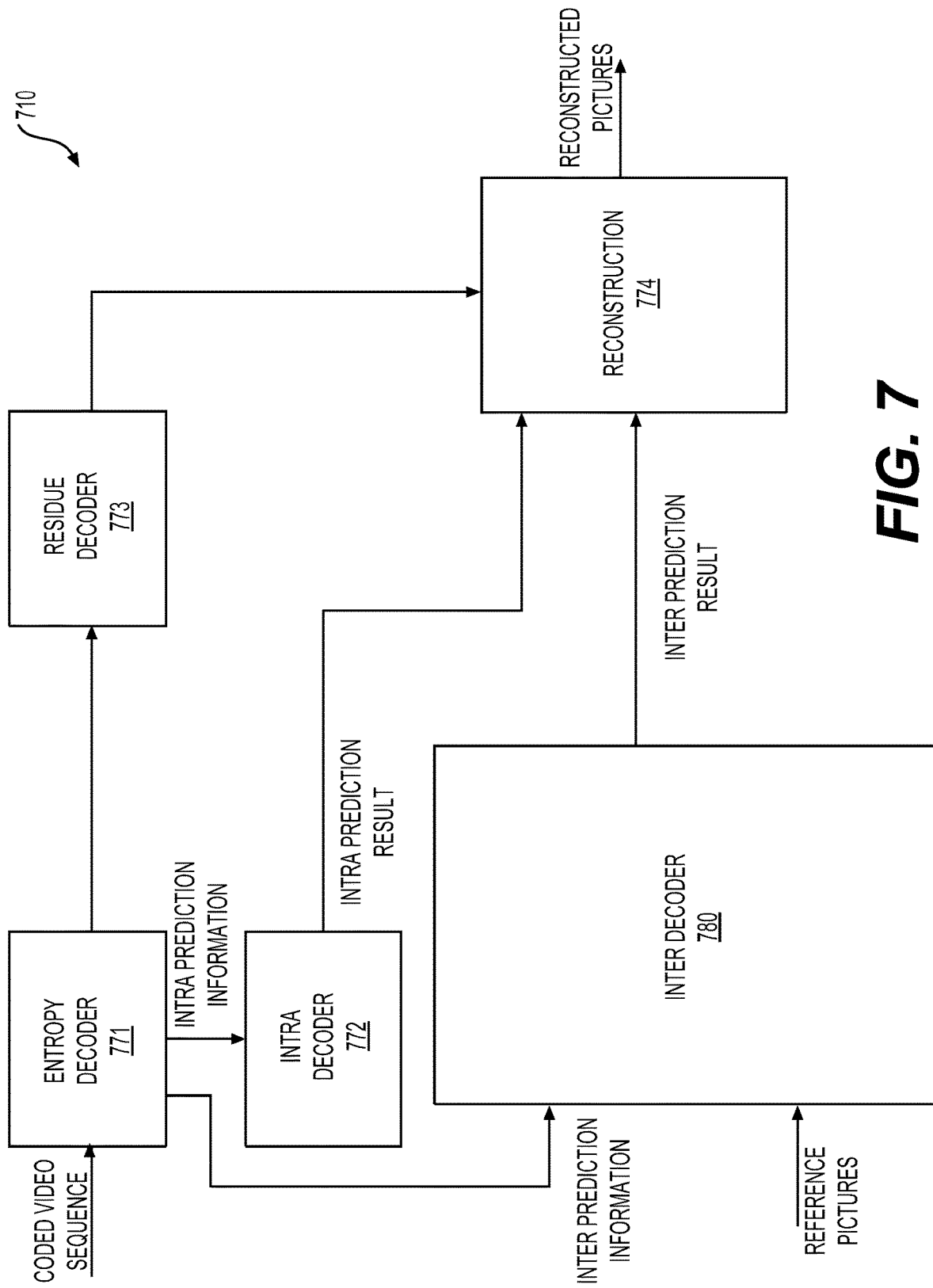
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

II. Inter Picture Prediction Modes

In various embodiments, a picture can be partitioned into blocks, for example, using a tree structure based partition scheme. The resulting blocks can then be processed according to different processing modes, such as an intra prediction mode, an inter prediction mode (e.g., merge mode, skip mode, advanced motion vector prediction (AVMP) mode), and the like. An intra coded block can be a block that is coded with an intra prediction mode. In contrast, an inter coded block can be a bock that is processed with an inter prediction mode.

1. Merge Mode

When a currently processed block, referred to as a current block, is processed according to the merge mode, a merge candidate list for the current block can be constructed according to a set of spatially and/or temporally neighboring blocks. One of the motion information candidates in the merge candidate list can be selected for determining or deriving the motion information for the current block. A merge index indicating which candidate is selected can be signaled from an encoder to a decoder.

Figure 8:
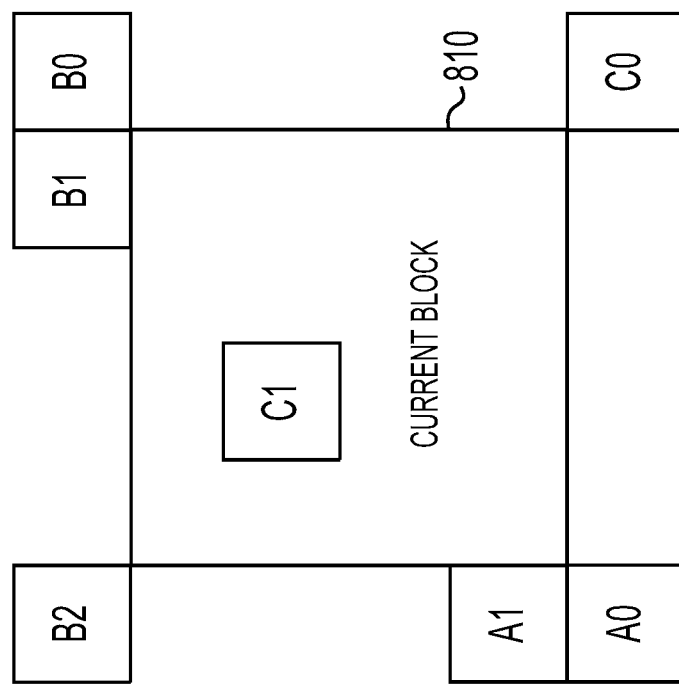
FIG. 8 is a schematic illustration of a current block and corresponding merge candidates according to a merge mode in accordance with an embodiment.

FIG. 8 is a schematic illustration of a current block and corresponding merge candidates according to a merge mode in accordance with an embodiment. In this example, a merge candidate list is to be constructed for a current block (810) that is to be processed according to the merge mode. A set of neighboring blocks, denoted A1, B1, B0, A0, B2, C0, and C1 are defined for the merge mode processing. Spatial candidates for constructing the merge candidate list can be determined according to spatially neighboring blocks A1, B1, B0, A0, and B2 that are in the same picture as the current block (810). Also, temporal candidates for constructing the merge candidate list can be determined according to temporal neighboring blocks C0 and C1, which correspond to blocks that are in another coded picture and neighbor or overlap a collocated block of the current block (810). In one example, the temporal neighboring block C1 can be located at a position corresponding to a position near (e.g., adjacent to) a center of the current block (810).

In some examples, the merge candidate list can have a predefined maximum number of merge candidates, represented as Cm. The merge candidates can be listed in the merge candidate list according to a certain order. In one example, according to a predefined order, a first number of merge candidates, Ca, can be derived from the spatially neighboring blocks according to the order {A1, B1, B0, A0, B2}, and a second number of merge candidates, Cb=Cm−Ca, can be derived from the temporally neighboring blocks according to the order {C0, C1}.

In some scenarios, candidate motion information from a particular neighboring block may be unavailable. For example, a neighboring block can be intra-predicted, outside of a slice or tile including the current block (810), or not in a same coding tree block (CTB) row as the current block (810). In some scenarios, candidate motion information from various neighboring blocks may be redundant. In some examples, the redundant merge candidate can be removed from the merge candidate list (e.g., by performing a pruning process). When a total number of available merge candidates (with redundant candidates being removed) in the merge candidate list is smaller than the maximum number of merge candidates Cm, one or more additional merge candidates can be added (e.g., according to a preconfigured rule) to fill the merge candidate list. For example, additional merge candidates can include combined bi-predictive candidates and/or zero motion vector candidates.

After the merge candidate list is constructed, at an encoder, an evaluation process can be performed to select a merge candidate from the merge candidate list. For example, rate-distortion (RD) performance corresponding to each merge candidate can be calculated, and the one with the best RD performance can be selected. Accordingly, a merge index associated with the selected merge candidate can be determined for the current block (810) and signaled to a decoder.

At a decoder, the merge index of the current block (810) can be received. A similar merge candidate list construction process, as described above, can be performed to generate a merge candidate list that is the same as the merge candidate list generated at the encoder side. After the merge candidate list is constructed, a merge candidate can be selected from the merge candidate list based on the received merge index without performing any further evaluations in some examples. Motion information of the selected merge candidate can be used for a subsequent motion-compensated prediction of the current block (810).

A skip mode is also introduced in some examples. For example, in the skip mode, a current block can be predicted using a merge mode as described above to determine a set of motion information, without introducing residue information. A skip flag can be associated with the current block. The skip flag and a merge index indicating the related motion information of the current block can be signaled to a video decoder. For example, at the beginning of a CU in an inter-picture prediction slice, a skip flag can be signaled that implies the following: the CU only contains one PU (2N×2N); the merge mode is used to derive the motion information; and no residual information is present in the bitstream. At the decoder side, based on the skip flag, a prediction block can be determined based on the merge index for decoding a respective current block without adding residue information. Thus, various methods for video coding with merge mode disclosed herein can be utilized in combination with a skip mode.

In some embodiments, a merge flag or a skip flag that is signaled in a bitstream can indicate whether the current block (810) is to be coded according to the merge mode. If the merge flag is set to be TRUE, a merge index can then be signaled to indicate which candidate in a merge candidate list will be used to provide motion information for the current block. In some embodiments, up to four spatial merge candidates (from four spatially neighboring blocks) and up to one temporal merge candidate (from one temporally neighboring block) can be added to the merge candidate list. A syntax MaxMergeCandsNum can be defined to indicate the size of the merge candidate list. The syntax MaxMergeVandsNum can be signaled in the bitstream.

1.1 Redundancy Check for Spatial Candidates

In some embodiments, to reduce computational complexity for performing a redundancy check process, not all possible candidate pairs are subject to the redundancy check process. Instead, in some examples, the redundancy check process can be limited to predetermine candidate pairs. A particular candidate can be added to the merge candidate list when the particular candidate has motion information different from those of other candidates in the corresponding candidate pairs.

Figure 9:
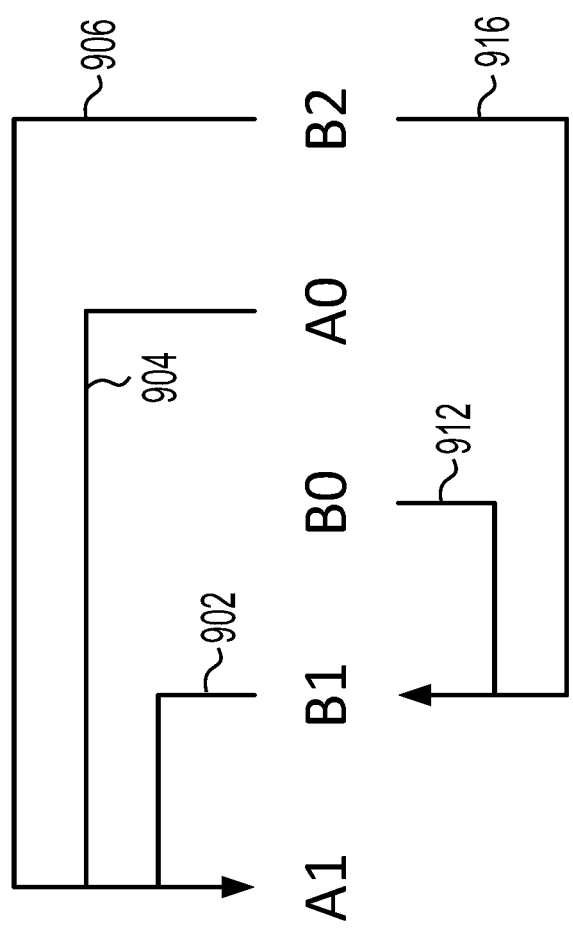
FIG. 9 is a chart of pairs of merge candidates subject to a redundancy check process in accordance with an embodiment.

FIG. 9 is a chart of pairs of merge candidates subject to the redundancy check process in accordance with an embodiment. FIG. 9 shows the following predetermined candidate pairs (denoted by their block references) linked by arrows (902, 904, 906, 912, and 916), including {A1, B1} (linked by arrow 902), {A1, A0} (linked by arrow 904), {A1, B2} (linked by arrow 906), {B1, B0} (linked by arrow 912), and {B1, B2} (linked by arrow 916). In at least one embodiment, only the candidate pairs defined in FIG. 9 are subject to the redundancy check process.

1.2 Motion Vector Scaling for Temporal Candidate

Figure 10:
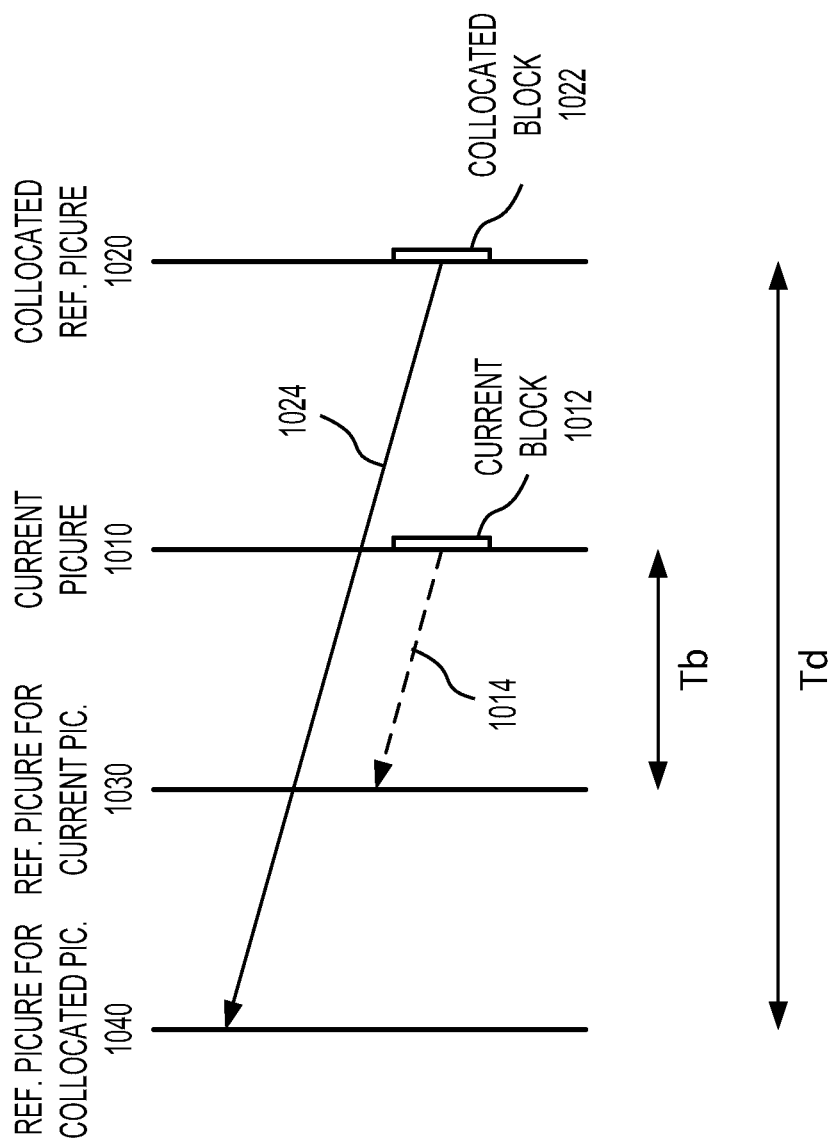
FIG. 10 is a schematic illustration of motion vector scaling for deriving a temporal merge candidate in accordance with an embodiment.

FIG. 10 is a schematic illustration of motion vector scaling for deriving a temporal merge candidate in accordance with an embodiment. In an embodiment, one temporal candidate can be added to the merge candidate list. In some embodiments, in the derivation of the temporal merge candidate for a current block (1012) in a current picture (1010), a scaled motion vector (1014) can be derived based on a collocated block (1022) included in a collocated reference picture (1020). A reference picture list indicating which picture is used as the collocated reference picture (1020) can be signaled in the bitstream, such as in a slice header in the bitstream. The scaled motion vector (1014) as the temporal merge candidate for the current block (1022) can be scaled from a motion vector (1024) of the collocated block (1022) using picture order count (POC) distances, Tb and Td. Tb is defined to be a POC difference between the current picture (1010) and a reference picture (1030) for the current picture (1010). Td is defined to be a POC difference between the collocated picture (1020) and a reference picture (1040) for the collocated picture (1020). A reference picture index of the temporal merge candidate can be set to zero.

Moreover, the position for the temporal candidate can be selected between temporal candidates from temporal neighboring blocks C0 and C1 shown in FIG. 8. In some embodiments, a temporal candidate from the temporal neighboring block C0 is first checked and used. If a temporal candidate from the temporal neighboring block C0 is not available, such as when the temporal neighboring block C0 is unavailable, intra coded, or is outside of a current row of CTUs, a temporal candidate from the temporal neighboring block C1 can then be used.

1.3 History-Based Motion Vector Derivation

In some embodiments, one or more history-based MV prediction (HMVP) candidates can be added to the merge candidate list after the spatial MV candidates and temporal MV candidate. The HMVP method includes storing the motion information of one or more previously coded blocks in a table and one or more HMVP candidates for the current block can be selected from the table. The table with the one or more HMVP candidates can be maintained during the encoding/decoding process. The table can be reset (emptied) when a new CTU row is to be processed. In some embodiments, whenever there is a non-subblock inter-coded CU, the associated motion information can be added to the last entry of the table as a new HMVP candidate.

In some embodiments, a size of the HMVP table can be set to be 6, which indicates up to 6 HMVP candidates can be included in the table. When inserting a new motion candidate to the table, a constrained first-in-first-out (FIFO) rule can be utilized, with a redundancy check is firstly applied to determine whether there is an identical HMVP already in the table. If a particular one of the stored candidate in the table is identical to a to-be-added HMVP candidate, the particular one of the stored candidate can be removed from the table, and all other HMVP candidates that come thereafter in the table can be moved up in response to the vacancy left by the removal of the particular one of the stored candidate.

In some embodiments, when the HMVP candidates are used in the merge candidate list construction process, the latest one or more HMVP candidates in the table can be checked according to a reverse chronological order and inserted to the candidate list after the temporal candidate. In some embodiments, a redundancy check can be performed on the HMVP candidates against to the spatial or temporal merge candidates already in the merge candidate list.

In some embodiments, to reduce the number of redundancy check operations, the redundancy check can be simplified by limiting a number of HMVP candidates used in the merge candidate list construction process. In some examples, the number of HMVP candidates used in the merge candidate list construction process can be set as (N<=4)?M: (8−N), wherein N indicates the number of existing candidates in the merge candidate list, and M indicates the number of available HMVP candidates in the table. In some embodiments, once the total number of candidates in the merge candidate list reaches the maximally allowed merge candidates minus 1, the process for adding candidates from HMVP to the merge candidate list can be terminated.

1.3 Pair-Wise Average Merge Candidates Derivation

In some embodiments, pairwise average candidates can be generated by averaging predefined pairs of candidates in a current merge candidate list. For example, the predefined pairs are defined as {(0, 1), (0, 2), (1, 2), (0, 3), (1, 3), (2, 3)} in an embodiment, where the numbers denote the merge indices to the merge candidate list. In some examples, the averaged motion vectors are calculated separately for each reference picture list. If both to-be-averaged motion vectors are available in one list, these two motion vectors can be averaged even when they point to different reference pictures. If only one motion vector is available, the available one can be used directly. If no motion vector is available, the respective pair can be skipped in one example. The pairwise average candidates replace the combined candidates in some embodiments in constructing a merge candidate list.

In some embodiments, when the merge candidate list is not full after pair-wise average merge candidates are added, one or more zero MVs can be added at the end of the merge candidate list until the maximum merge candidate number is reached.

2. Merge with Motion Vector Difference (MMVD) Mode

In some embodiments, a merge with motion vector difference (MMVD) mode is used for determining a motion vector predictor of a current block. The MMVD mode can be used when skip mode or merge mode is enabled. The MMVD mode reuses merge candidates on a merge candidate list of the skip mode or merge mode. For example, a merge candidate selected from the merge candidate list can be used to provide a starting point at a reference picture. A motion vector of the current block can be expressed with the starting point and a motion offset including a motion magnitude and a motion direction with respect to the starting point. At an encoder side, selection of the merge candidate and determination of the motion offset can be based on a search process (an evaluation process). At a decoder side, the selected merge candidate and the motion offset can be determined based on signaling from the encoder side.

In the MMVD mode, a selected merge candidate can be further refined by the signaled motion vector difference (MVD) information. In some embodiments, the MVD information includes a merge candidate flag, an index to specify motion magnitude, and an index for indication of motion direction. In the MMVD mode, one of the candidates in the merge candidate list can be selected to be used as a MV basis. The merge candidate flag is signaled to specify which one is selected as the MV basis.

The distance index can be used to specify a predefined offset for a horizontal component or a vertical component of a starting point MV. For example, a plurality of predefined pixel distances are shown in Table 1 each associated with indices from 0 to 7. The pixel distance having an index of the distance index can be determined from the plurality of pixel distances, and used to provide the motion magnitude. an offset is added to either horizontal component or vertical component of starting MV. The relation of distance index and pre-defined offset is specified in Table 1.

TABLE 1

| | Distance Index | | | | | | | |
|---|---|---|---|---|---|---|---|---|
| Distance Index | 0 | 1 | 2 | 3 | 4 | 5 | 6 | 7 |
| Pixel Distance | ¼-pel | ½-pel | 1-pel | 2-pel | 4-pel | 8-pel | 16-pel | 32-pel |

The direction index represents the direction of the MVD relative to the starting point. For example, four directions with indices from 00 to 11 (binary) are shown in Table 2. The direction with an index of the direction index can be determined from the four directions, and used to provide a direction of the motion offset with respect to the starting point.

TABLE 2

| | Direction Index | | | |
|---|---|---|---|---|
| Direction Index | 00 | 01 | 10 | 11 |
| x-axis | + | − | N/A | N/A |
| y-axis | N/A | N/A | + | − |

In some embodiments, the definition of the MVD direction can vary according to the information of starting MVs. When the starting MVs is an un-prediction MV or bi-prediction MVs with both lists pointing to the same side of the current picture (i.e. POCs of two reference pictures are both larger than the POC of the current picture, or are both smaller than the POC of the current picture), the direction as identified according to Table 2 can be used to specify the direction of MV offset added to the starting MV. When the starting MVs is bi-prediction MVs with the two MVs pointing to the different sides of the current picture (i.e. the POC of one reference picture is larger than the POC of the current picture, and the POC of the other reference picture is smaller than the POC of the current picture), the direction as identified according to Table 2 can be used to add the MV offset for the list0 MV component of the starting MV and the opposite direction for the list1 MV component.

Figure 11:
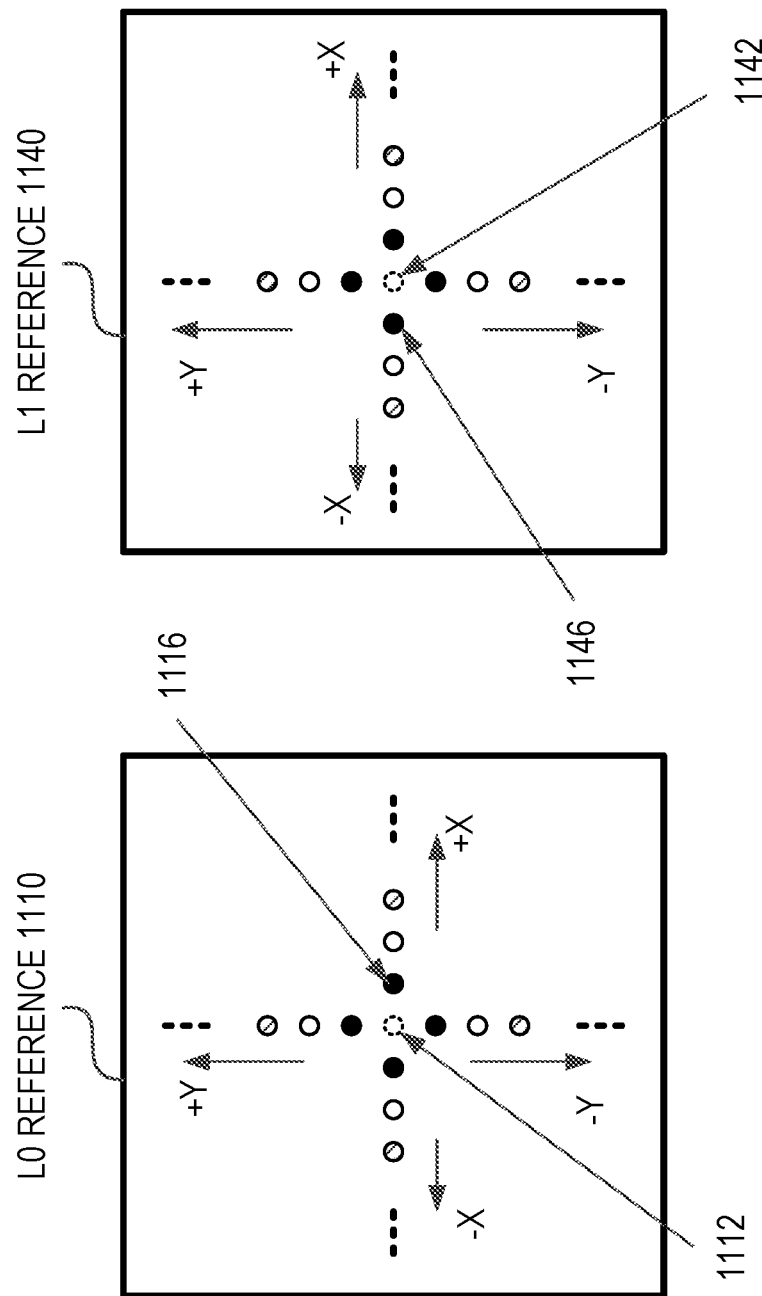
FIG. 11 is a schematic illustration of predetermined points surrounding two starting points that are to be evaluated in a merge mode with motion vector difference (MMVD) in accordance with an embodiment.

FIG. 11 is a schematic illustration of predetermined points surrounding two starting points that are to be evaluated in a merge mode with MMVD in accordance with an embodiment. In the example shown in FIG. 11, a first and second motion vectors of a current block are associated with two reference pictures (1110) and (1140) in reference picture lists L0 and L1, respectively. Two starting points (1112) and (1142) can be determined at the reference pictures (1110) and (1140).

In an example at the encoding side, based on the starting points (1112) and (1142), multiple predefined points extending from the starting points (1112) and (1142) in vertical directions (represented by +Y, or −Y) or horizontal directions (represented by +X and −X) in the reference pictures (1110) and (1140) can be evaluated. Based on the evaluations, a merge candidate can be selected from the merge list, and a motion direction and a motion distance can also be determined. For example, based on the selected merge candidate, a base candidate index can be determined. Based on the selected motion vector predictor, such as that corresponding to the predefined point (e.g., 1116 or 1146), a direction and a distance of the point (e.g., 1116 or 1146) with respect to the starting point (1112 or 1142) can be determined. According to Table 1 and Table 2, a direction index and a distance index can accordingly be determined. In an example at the decoding side, based on the signaled starting point, direction, and distance, a refined motion vector according to MMVD can be determined.

3. Affine Prediction Mode

Figures 12A, 12B:
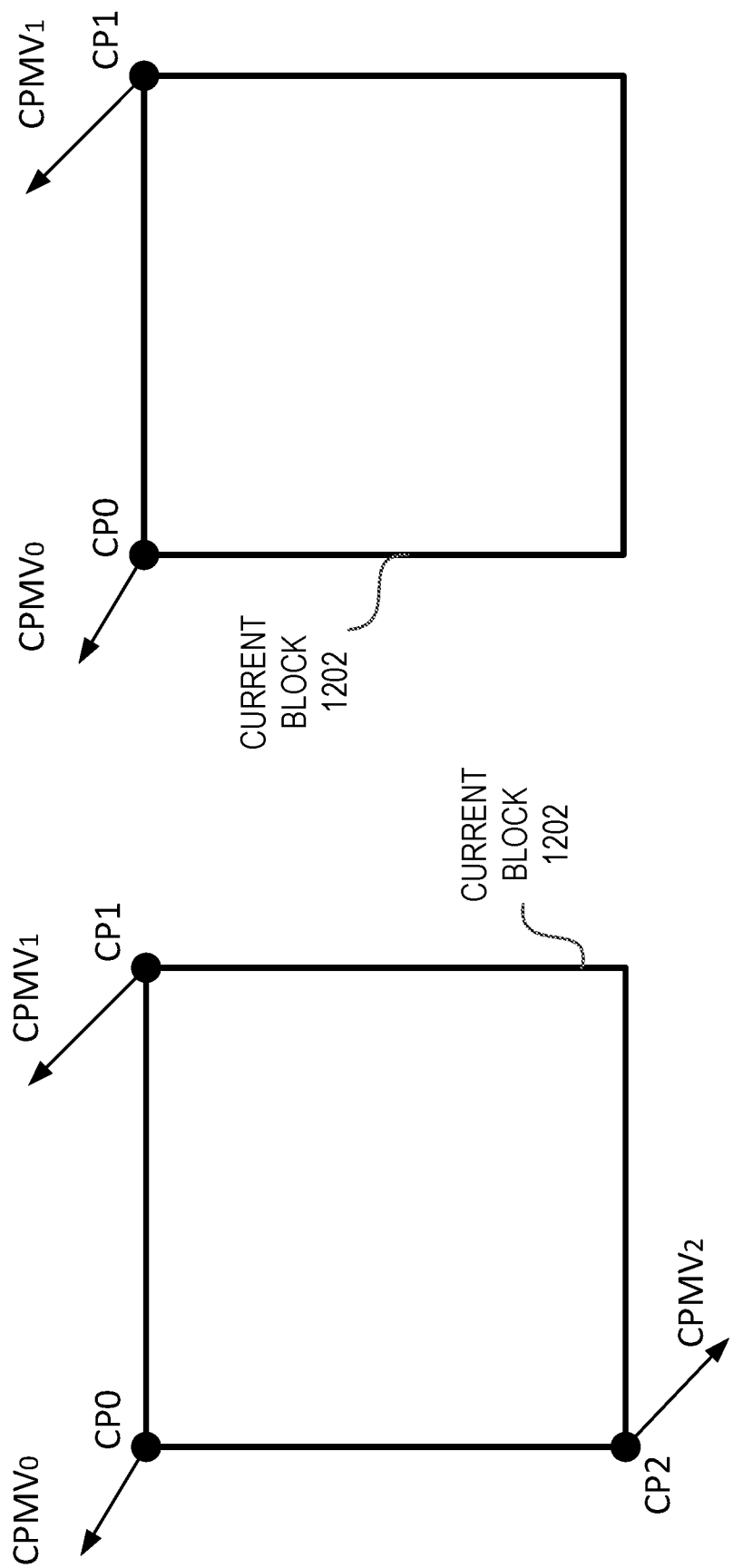
FIG. 12A is a schematic illustration of a 6-parameter (according to three control points) affine model in accordance with an embodiment.
FIG. 12B is a schematic illustration of a 4-parameter (according to two control points) affine model in accordance with an embodiment.

In some examples, a motion vector of a current block and/or sub-blocks of the current block can be derived using an affine model (e.g., a 6-parameter affine model or a 4-parameter affine model). FIG. 12A is a schematic illustration of a 6-parameter (according to three control points) affine model in accordance with an embodiment.

In an example, the 6 parameters of an affine coded block (e.g., current block 1202) can be represented by three motion vectors (also referred to as three control point motion vectors (CPMVs, e.g., CPMV$_0$, CPMV$_1$, and CPMV$_2$) at three different locations of the current block (e.g., control points CP0, CP1, and CP2 at upper-left, upper-right, and lower-left corners in FIG. 12A). In some embodiments, for the 6-parameter affine model, a motion vector at a sample location (x, y) in the current block (1202) can be derived as:

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases} \quad \text{(Equation 1)}$$

where ($mv_{0x}$, $mv_{0y}$) represents a motion vector of the upper-left corner control point (CPMV$_0$), ($mv_{1x}$, $mv_{1y}$) represents a motion vector of the upper-right corner control point (CPMV$_1$), and ($mv_{2x}$, $mv_{2y}$) represents a motion vector of the lower-left corner control point (CPMV$_2$). Also, W represents a width of the current block (1202), and H represents a height of the current block (1202).

FIG. 12B is a schematic illustration of a 4-parameter (according to two control points) affine model in accordance with an embodiment. In another example, a simplified affine model uses four parameters to describe the motion information of an affine coded block (e.g., current block 1202), which can be represented by two motion vectors (also referred to as two CPMVs, e.g., CPMV$_0$ and CPMV$_1$) at two different locations of the current block (e.g., control points CP0 and CP1 at upper-left and upper-right corners in FIG. 12B). In some embodiments, for the 4-parameter affine model, a motion vector at a sample location (x, y) in the current block (1202) can be derived as:

$$\begin{cases} mv_x = \frac{mv_{1x} - mv_{0x}}{W}x + \frac{mv_{1x} - mv_{0x}}{W}y + mv_{0x} \\ mv_y = \frac{mv_{1y} - mv_{0y}}{W}x + \frac{mv_{1y} - mv_{0y}}{W}y + mv_{0y} \end{cases} \quad \text{(Equation 2)}$$

where ($mv_{0x}$, $mv_{0y}$) represents a motion vector of the upper-left corner control point (CPMV$_0$), and ($mv_{1x}$, $mv_{1y}$) represents a motion vector of the upper-right corner control point (CPMV$_1$). Also, W represents a width of the current block (1202).

Figure 12C:
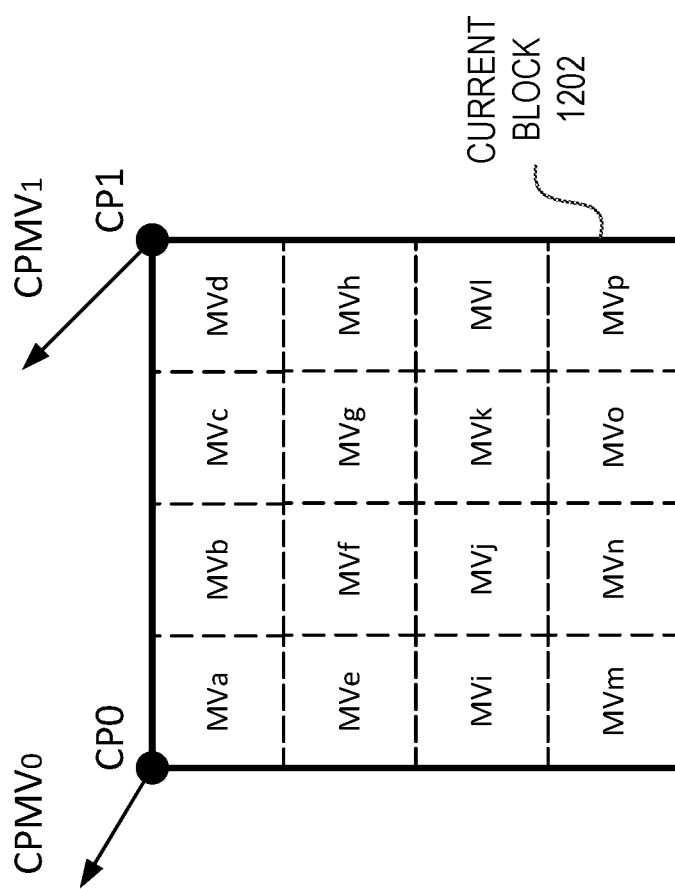
FIG. 12C is a schematic illustration of motion vectors derived for sub-blocks of a current block coded according to an affine prediction method in accordance with an embodiment.

In some embodiments, in order to simplify the motion compensation prediction, subblock-based affine prediction method is applied. FIG. 12C is a schematic illustration of motion vectors derived for sub-blocks of a current block coded according to an affine prediction method in accordance with an embodiment. In FIG. 12C, the current block (1202) can be divided into sub-blocks. In this example, each sub-block can be a 4×4 luma sub-block. Sub-block motion vectors (MVa-MVp) correspond to the centers of the respective sub-blocks can be calculated according to 4-parameter affine prediction method as described above, and rounded to 1/16 fraction accuracy. The motion compensation predicted block data for the sub-blocks can be generated according to the calculated sub-block motion vectors.

In some embodiments, the sub-block size of chroma-components can also be set to 4×4. The MV of a 4×4 chroma sub-block can be calculated as the average of the MVs of the four corresponding 4×4 luma sub-blocks.

In some embodiments, the CPMVs can be explicitly. In some embodiments, the CPMVs can be determined according to various CPMV prediction methods, such as an affine merge mode or an affine AMVP mode.

3.1. Affine Merge Mode

Figure 13:
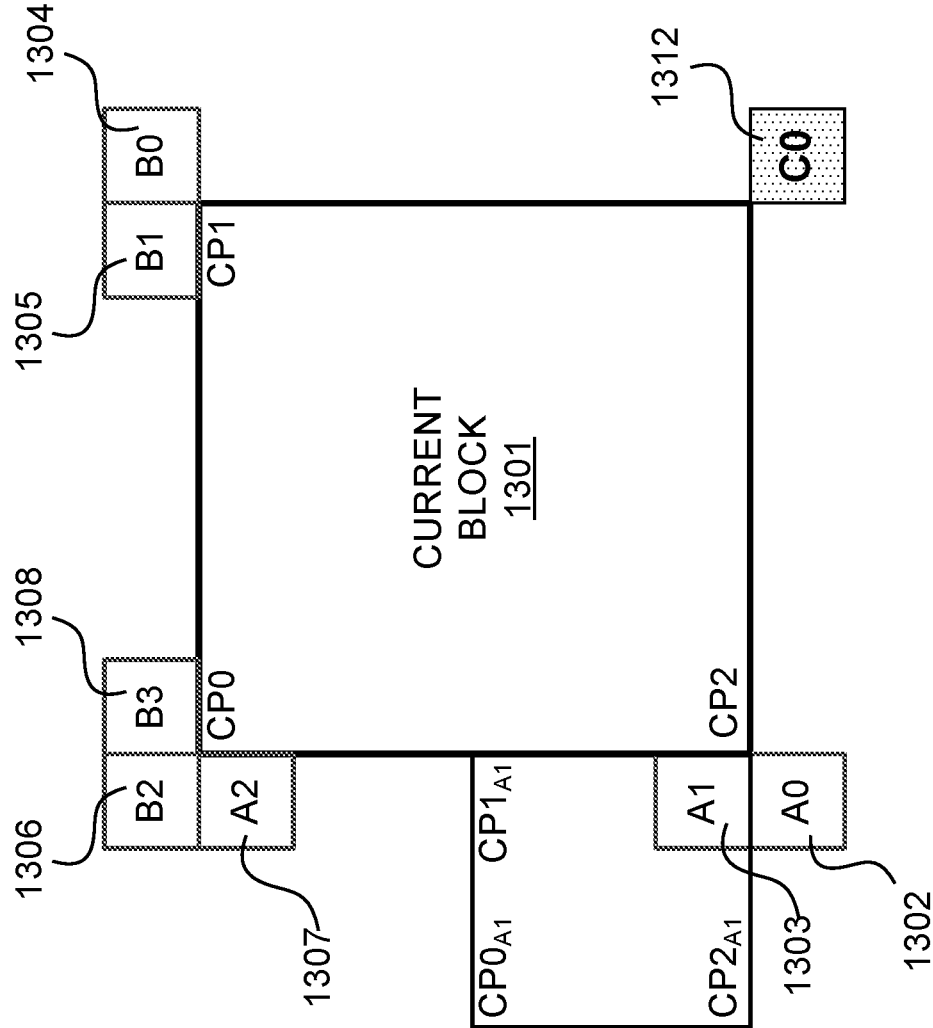
FIG. 13 is a schematic illustration of spatial neighboring blocks and a temporal neighboring block for a current block coded according to an affine prediction method in accordance with an embodiment.

FIG. 13 is a schematic illustration of spatial neighboring blocks and a temporal neighboring block for a current block (1301) coded according to an affine prediction method in accordance with an embodiment. As shown, the spatially neighboring blocks are denoted A0, A1, A2, B0, B1, B2, and B3 (1302, 1303, 1307, 1304, 1305, 1306, and 1308, respectively), and the temporally neighboring block is denoted C0 (1312). In some examples, the spatially neighboring blocks A0, A1, A2, B0, B1, B2, and B3 and the current block (1301) are in a same picture. In some examples, the temporally neighboring block C0 is in a reference picture and corresponds to a position outside the current block (1301) and adjacent to a lower-right corner of the current block (1301).

A list of motion information candidates (also referred to as an affine merge candidate list) can be constructed using an affine merge mode based on motion information of one or more of the spatial neighboring blocks and/or temporal neighboring blocks. In some examples, the affine merge mode can be applied when the current block (1301) has a width and height that are equal to or greater than 8 samples. According to the affine merge mode, the CPMVs of the current block (1301) can be determined based on the motion information candidates on the list. In some examples, the list of motion information candidates can include up to five CPMV candidates, and an index can be signaled to indicate which CPMV candidate is to be used for the current block. In some embodiments, a CPMV candidate includes all the CPMVs for an affine model.

In some embodiments, the affine merge candidate list can have three types of CPVM candidates, including inherited affine candidates, constructed affine candidates, and a zero MV. An inherited affine candidate can be derived by extrapolation from the CPMVs of the neighboring blocks. A constructed affine candidate can be derived using the translational MVs of the neighboring blocks.

In an example, there can be at most two inherited affine candidates, which are derived from corresponding affine motion models of the neighboring blocks, including one block from left neighboring blocks (A0 and A1) and one from upper neighboring blocks (B0, B1, and B2). For the candidate from the left, neighboring blocks A0 and A1 can be sequentially checked, and a first available inherited affine candidate from neighboring blocks A0 and A1 is used as the inherited affine candidate from the left. For the candidate from the top, neighboring blocks B0, B1, and B2 can be sequentially checked, and a first available inherited affine candidate from neighboring blocks B0, B1, and B2 is used as the inherited affine candidate from the top. In some examples, no pruning check is performed between the two inherited affine candidates.

When a neighboring affine block is identified, a corresponding inherited affine candidate to be added to the affine merge list of the current block (1301) can be derived from the control point motion vectors of the neighboring affine block. In the FIG. 13 example, if the neighboring block A1 is coded in affine mode, the motion vectors of the upper-left corner (control point $CP0_{A1}$), the upper-right corner (control point $CP1_{A1}$), and the lower-left corner (control point $CP2_{A1}$) of block A1 can be obtained. When block A1 is coded using a 4-parameter affine model, the two CPMVs as an inherited affine candidate of the current block (1301) can be calculated according to the motion vectors of control point $CP0_{A1}$ and control point $CP1_{A1}$. When block A1 is coded using a 6-parameter affine model, the three CPMVs as an inherited affine candidate of the current block (1301) can be calculated according to the motion vectors of control point $CP0_{A1}$, control point $CP1_{A1}$, and control point $CP2_{A1}$.

Moreover, a constructed affine candidate can be derived by combining the neighboring translational motion information of each control point. The motion information for the control points CP0, CP1, and CP2 is derived from the specified spatial neighboring blocks A0, A1, A2, B0, B1, B2, and B3.

For example, $CPMV_k$ (k=0, 1, 2, 3) represents the motion vector of four different control points, where $CPMV_0$ corresponds to control point CP0, $CPMV_1$ corresponds to control point CP1, $CPMV_2$ corresponds to control point CP2, and $CPMV_3$ corresponds to a temporal control point based on temporal neighboring block C0. For $CPMV_0$, neighboring blocks B2, B3, and A2 can be sequentially checked, and a first available motion vector from neighboring blocks B2, B3, and A2 is used as $CPMV_0$. For $CPMV_1$, neighboring blocks B1 and B0 can be sequentially checked, and a first available motion vector from neighboring blocks B1 and B0 is used as $CPMV_1$. For $CPMV_2$, neighboring blocks A1 and A0 can be sequentially checked, and a first available motion vector from neighboring blocks A1 and A0 is used as $CPMV_2$. Moreover, the motion vector of temporal neighboring block C0 can be used as $CPMV_4$, if available.

After $CPMV_0$, $CPMV_1$, $CPMV_2$, and $CPMV_3$, of four control points CP0, CP1, CP2 and the temporal control point are obtained, an affine merge candidate list can be constructed to include affine merge candidates that are constructed in an order of: $\{CPMV_0, CPMV_1, CPMV_2\}$, $\{CPMV_0, CPMV_1, CPMV_3\}$, $\{CPMV_0, CPMV_2, CPMV_3\}$, $\{CPMV_1, CPMV_2, CPMV_3\}$, $\{CPMV_0, CPMV_1\}$, and $\{CPMV_0, CPMV_2\}$. Any combination of three CPMVs can form a 6-parameter affine merge candidate, and any combination of two CPMVs can form a 4-parameter affine merge candidate. In some examples, in order to avoid a motion scaling process, if the reference indices of a group of control points are different, the corresponding combination of CPMVs can be discarded.

In some embodiments, after inherited affine merge candidates and constructed affine merge candidate are checked, if the list is still not full, zero MVs are inserted to the end of the list.

3.2. Affine AMVP Mode

In some embodiments, a list of motion information candidates can be constructed using an affine AMVP mode when the current block (1301) has a width and height that are equal to or greater than 16 samples. According to the affine AMVP mode, an affine flag in the CU level can be signalled in the bitstream to indicate whether affine AMVP mode is used, and then another flag can be signaled to indicate whether a 4-parameter affine or a 6-parameter affine model is used. In the affine AMVP mode, the difference of the CPMVs of the current block and corresponding CPMV predictors (CPMVPs) can be signalled in the bitstream. In some embodiments, an affine AVMP candidate list can has a size of two candidates is generated by using the following four types of CPVM candidate in order, including (1) inherited affine AMVP candidates that extrapolated from the CPMVs of one or more neighboring CUs; (2) constructed affine AMVP candidates that are derived using the translational MVs of one or more neighboring CUs; (3) translational MVs from one or more neighboring CUs; and (4) Zero MVs.

For deriving inherited affine AMVP candidates, in some examples, the checking order of inherited affine AMVP candidates is the same as the checking order of inherited affine merge candidates. The AVMP candidates can be determined only from the affine CUs that have the same reference picture as the current block. In some embodiments, no pruning process is applied when inserting an inherited affine motion predictor into the candidate list.

For deriving constructed affine AMVP candidates, in some examples, the constructed AMVP candidate can be derived from one or more neighboring blocks as shown in FIG. 13 with the same checking order that is used during the affine merge candidate construction. In addition, the reference picture indices of the neighboring blocks are also checked. For example, the first block in the checking order that is inter coded and has the same reference picture as the current block can be used. In some embodiments, there can be only one constructed affine AMVP candidate. In some embodiments, when the current block is coded according to a 4-parameter affine mode, and the control point motion vectors of a checked neighboring block corresponding to CP0 and CP1 thereof are both available, a collection of these control point motion vectors of the checked neighboring block can be added as a candidate in the affine AMVP list.

When the current block is coded according to a 6-parameter affine mode, and the control point motion vectors of a checked neighboring block corresponding to CP0, CP1, and CP2 thereof are all available, a collection of these control point motion vectors of the checked neighboring block can be added as a candidate in the affine AMVP list. Otherwise, the constructed AMVP candidate from the checked neighboring block can be determined as unavailable.

In some embodiments, if the affine AVMP candidate list has less than two candidates after checking the inherited affine AMVP candidates and constructed AMVP candidates, a candidate derived according to translational MVs from one or more neighboring blocks can be added to the affine AVMP candidate list. Finally, zero MVs can be used to fill the affine AVMP candidate list if the list is still not full.

4. Subblock-Based Temporal Motion Vector Prediction (SbTMVP) Mode

Figure 14A:
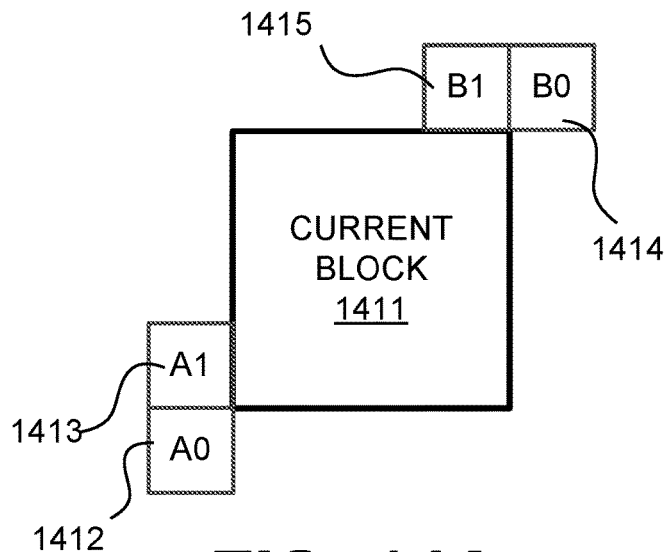
FIG. 14A is a schematic illustration of spatial neighboring blocks that can be used to determine predicted motion information for a current block using a subblock-based temporal motion vector prediction method in accordance with one embodiment.

FIG. 14A is a schematic illustration of spatial neighboring blocks that can be used to determine predicted motion information for a current block (1411) using a subblock-based temporal motion vector prediction (SbTMVP) method in accordance with one embodiment. FIG. 14A shows a current block (1411) and its spatial neighboring blocks denoted A0, A1, B0, and B1 (1412, 1413, 1414, and 1415, respectively). In some examples, spatial neighboring blocks A0, A1, B0, and B1 and the current block (1411) are in a same picture.

Figure 14B:
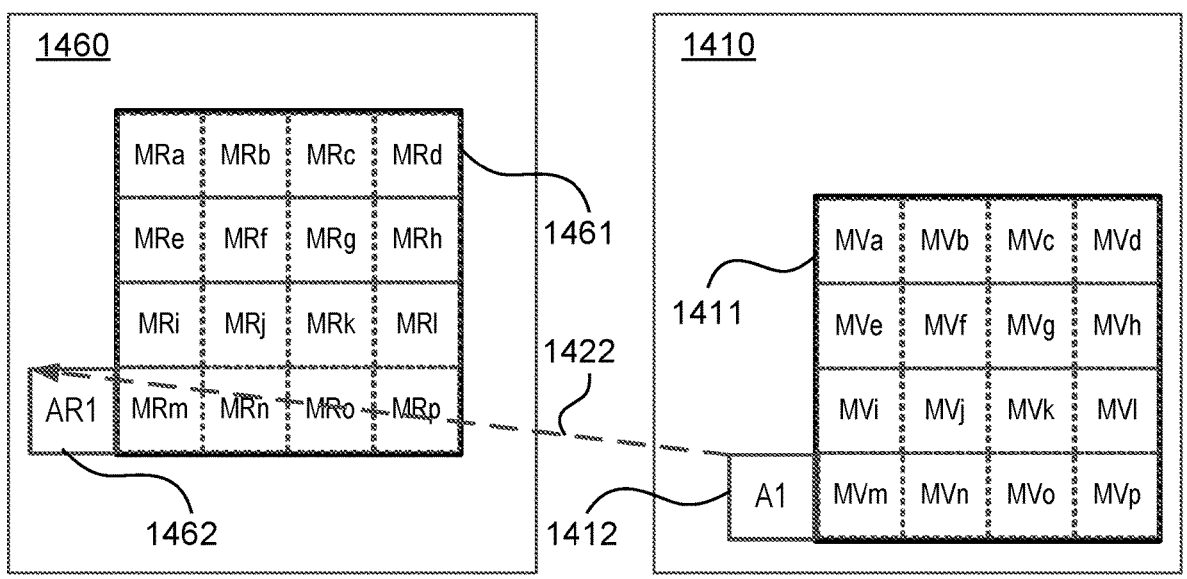
FIG. 14B is a schematic illustration of a selected spatial neighboring block for a subblock-based temporal motion vector prediction method in accordance with one embodiment.

FIG. 14B is a schematic illustration for determining motion information for sub-blocks of the current block (1411) using the SbTMVP method based on a selected spatial neighboring block, such as block A1 in this non-limiting example, in accordance with an embodiment. In this example, the current block (1411) is in a current picture (1410), and a reference block (1461) is in a reference picture (1460) and can be identified based on a motion shift (or displacement) between the current block (1411) and the reference block (1461) indicated by a motion vector (1422).

In some embodiments, similar to a temporal motion vector prediction (TMVP) in HEVC, a SbTMVP uses the motion information in various reference sub-blocks in a reference picture for a current block in a current picture. In some embodiments, the same reference picture used by TMVP can be used for SbTVMP. In some embodiments, TMVP predicts motion information at a CU level but SbTMVP predicts motion at a sub-CU level. In some embodiments, TMVP uses the temporal motion vectors from a collocated block in the reference picture, which has a corresponding position adjacent to a lower-right corner or a center of a current block, and SbTMVP uses the temporal motion vectors from a reference block, which can be identified by performing a motion shift based on a motion vector from one of the spatial neighboring blocks of the current block.

For example, as shown in FIG. 14A, neighboring blocks A1, B1, B0, and A0 can be sequentially checked in a SbTVMP process. As soon as a first spatial neighboring block that has a motion vector that uses the reference picture (1460) as its reference picture is identified, such as block A1 having the motion vector (1422) that points to a reference block AR1 in the reference picture (1460) for example, this motion vector (1422) can be used for performing the motion shift. If no such motion vector is available from the spatial neighboring blocks A1, B1, B0, and A0, the motion shift is set to (0, 0).

After determining the motion shift, the reference block (1461) can be identified based on a position of the current block (1411) and the determined motion shift. In FIG. 10B, the reference block (1461) can be further divided into 16 sub-blocks with reference motion information MRa through MRp. In some examples, the reference motion information for each sub-block in the reference block (1461) can be determined based on a smallest motion grid that covers a center sample of the respective sub-block. The motion information can include motion vectors and corresponding reference indices. The current block (1411) can be further divided into 16 sub-blocks, and the motion information MVa through MVp for the sub-blocks in the current block (1411) can be derived from the reference motion information MRa through MRp in a manner similar to the TMVP process, with temporal scaling in some examples.

The sub-block size used in the SbTMVP process can be fixed (or otherwise predetermined) or signaled. In some examples, the sub-block size used in the SbTMVP process can be 8×8 samples. In some examples, the SbTMVP process is only applicable to a block with a width and height equal to or greater than the fixed or signaled size, for example 8 pixels.

In an example, a combined sub-block based merge list which contains a SbTVMP candidate and affine merge candidates is used for the signaling of a sub-block based merge mode. The SbTVMP mode can be enabled or disabled by a sequence parameter set (SPS) flag. In some examples, if the SbTMVP mode is enabled, the SbTMVP candidate is added as the first entry of the list of sub-block based merge candidates, and followed by the affine merge candidates. In some embodiments, the maximum allowed size of the sub-block based merge list is set to five. However, other sizes may be utilized in other embodiments.

In some embodiments, the encoding logic of the additional SbTMVP merge candidate is the same as for the other merge candidates. That is, for each block in a P or B slice, an additional rate-distortion check can be performed to determine whether to use the SbTMVP candidate.

5. Triangular Prediction

A triangular prediction mode (TPM) can be employed for inter prediction in some embodiments. In an embodiment, the TPM is applied to CUs that are 8×8 samples or larger in size and are coded in skip or merge mode. In an embodiment, for a CU satisfying these conditions (8×8 samples or larger sizes and coded in skip or merge mode), a CU-level flag is signaled to indicate whether the TPM is applied or not.

Figure 15A:
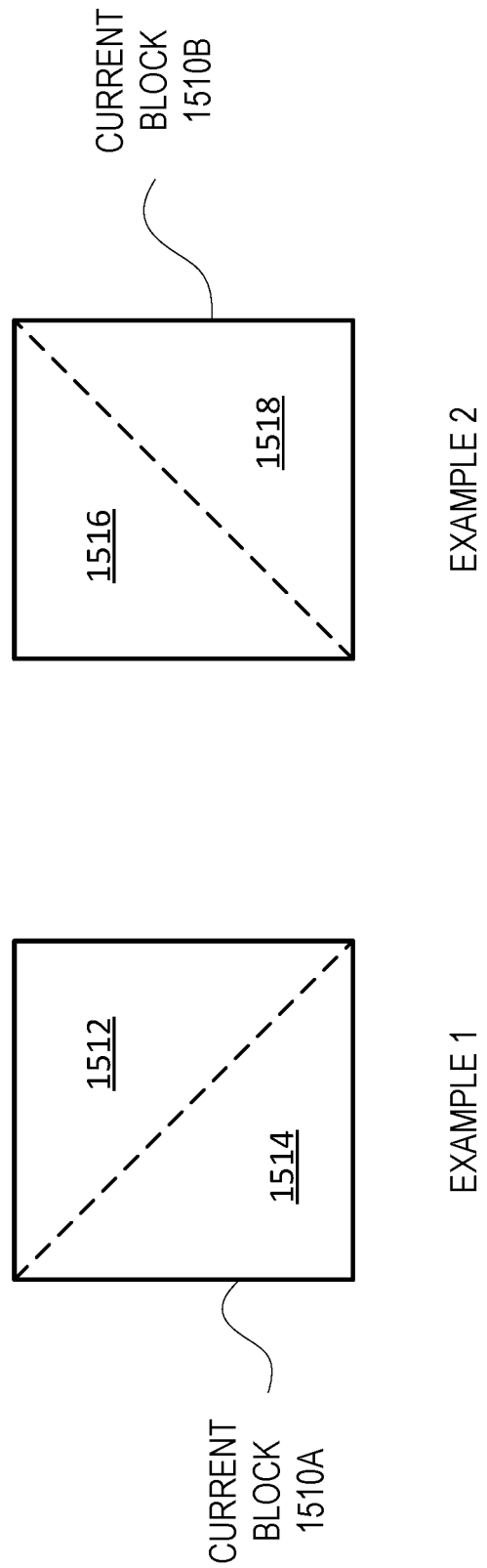
FIG. 15A is a schematic illustration of two splitting examples for a current block according to a triangle prediction method in accordance with one embodiment.

FIG. 15A is a schematic illustration of two splitting examples for a current block according to a triangle prediction unit mode in accordance with one embodiment. When the TPM is used, in some embodiments, a CU is split evenly into two triangle-shaped partitions, along a diagonal from an upper-left corner to a lower-right corner (e.g., a diagonal split) or along a diagonal from an upper-right corner to a lower-left corner (e.g., an anti-diagonal split) as shown in FIG. 15A. In FIG. 15A, a current block (or also referred to as a CU) (1510A) can be split from an upper-left corner to a lower-right corner resulting in two triangular prediction units (1512) and (1514). The CU (1510B) can also be split from an upper-right corner to a lower-left corner resulting in two triangular prediction units (1516) and (1518). Each triangular prediction unit (1512), (1514), (1516), and (1518) in the two examples (1510A) and (1510B) can be inter-predicted using its own motion information.

In some embodiments, only uni-prediction is allowed for each triangular prediction unit. Accordingly, each triangular prediction unit has one motion vector and one reference picture index. The uni-prediction motion constraint can be applied to ensure that, similar to a conventional bi-prediction method, not more than two motion compensated predictions are performed for each CU. In this way, processing complexity can be reduced. The uni-prediction motion information for each triangular prediction unit can be derived from a uni-prediction merge candidate list. In some other embodiments, bi-prediction is allowed for each triangular prediction unit. Accordingly, the bi-prediction motion information for each triangular prediction unit can be derived from a bi-prediction merge candidate list.

In some embodiments, when a CU-level flag indicates that a current CU is coded using the TPM, an index, referred to as triangle partition index, is further signaled. For example, the triangle partition index can have a value in a range of [0, 39]. Using this triangle partition index, the direction of the triangle partition (diagonal or anti-diagonal), as well as the motion information for each of the partitions (e.g., merge indices (or referred to as TPM indices) to the respective uni-prediction candidate list) can be obtained through a look-up table at the decoder side.

After predicting each of the triangular prediction unit based on the obtained motion information, in an embodiment, the sample values along the diagonal or anti-diagonal edge of the current CU are adjusted by performing a blending process with adaptive weights. As a result of the blending process, a prediction signal for the whole CU can be obtained. Subsequently, a transform and quantization process can be applied to the whole CU in a way similar to other prediction modes. Finally, a motion field of a CU predicted using the triangle partition mode can be created, for example, by storing motion information in a set of 4×4 units partitioned from the CU. The motion field can be used, for example, in a subsequent motion vector prediction process to construct a merge candidate list.

5.1 Uni-Prediction Candidate List Construction

In some embodiments, a merge candidate list for prediction of two triangular prediction units of a coding block processed with a TPM can be constructed based on a set of spatial and temporal neighboring blocks of the coding block. Such a merge candidate list can be referred to as a TPM candidate list with TPM candidates listed herein. In one embodiment, the merge candidate list is a uni-prediction candidate list.

Figure 15B:
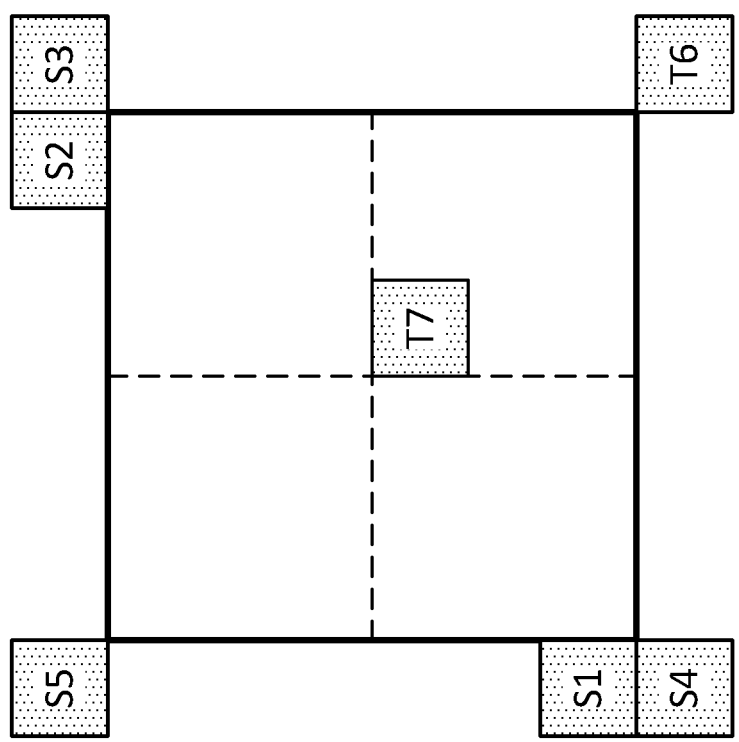
FIG. 15B shows an example of spatial and temporal neighboring blocks used to construct a uni-prediction candidate list for a triangle prediction method in accordance with an embodiment.

FIG. 15B shows an example of spatial and temporal neighboring blocks used to construct a uni-prediction candidate list for a triangular prediction mode in accordance with an embodiment. In some embodiments, the uni-prediction candidate list includes five uni-prediction motion vector candidates in an embodiment. For example, the five uni-prediction motion vector candidates are derived from seven neighboring blocks including five spatially neighboring blocks (denoted by S1 to S5 in FIG. 15B) and two temporally neighboring blocks (denoted by T6 and T7 in FIG. 15B).

In an example, the motion vectors of the seven neighboring blocks are collected and put into the uni-prediction candidate list according to the following order: first, the motion vectors of the uni-predicted neighboring blocks; (b) then, for the bi-predicted neighboring blocks, the L0 motion vectors (that is, the L0 motion vector part of the bi-prediction MV), the L1 motion vectors (that is, the L1 motion vector part of the bi-prediction MV), and averaged motion vectors of the L0 and L1 motion vectors of the bi-prediction MVs. In an example, if the number of candidates is less than five, zero motion vectors are added to the end of the list. In some other embodiments, the merge candidate list may include less than 5 or more than 5 uni-prediction or bi-prediction merge candidates that are selected from candidate positions that are the same or different from that shown in FIG. 15B.

In an embodiment, a CU is coded with a triangular partition mode with a TPM (or merge) candidate list including five TPM candidates. Accordingly, there are 40 possible ways to predict the CU when 5 merge candidates are used for each triangular PU. In other words, there can be 40 different combinations of split directions and merge (or TPM) indices: 2 (possible split directions)×(5 (possible merge indices for a first triangular prediction unit)×5 (possible merge indices for a second triangular prediction unit)−5 (a number of possibilities when the pair of first and second prediction units shares a same merge index)). For example, when a same merge index is determined for the two triangular prediction units, the CU can be processed using a regular merge mode, instead of the triangular predication mode.

Accordingly, in an embodiment, a triangular partition index in the range of [0, 39] can be used to represent which one of the 40 combinations is used based on a lookup table as shown in Table 4 below.

TABLE 3

| Look up table used to derive triangle direction and partition motions based on triangle index | | | | | | | | | | | | | | | | | | | | |
|---|---|---|---|---|---|---|---|---|---|---|---|---|---|---|---|---|---|---|---|---|
| triangle_idx | 0 | 1 | 2 | 3 | 4 | 5 | 6 | 7 | 8 | 9 | 10 | 11 | 12 | 13 | 14 | 15 | 16 | 17 | 18 | 19 |
| triangle dir | 0 | 1 | 1 | 0 | 0 | 1 | 1 | 1 | 0 | 0 | 0 | 0 | 1 | 0 | 0 | 0 | 0 | 1 | 1 | 1 |
| Part 1 cand | 1 | 0 | 0 | 0 | 2 | 0 | 0 | 1 | 3 | 4 | 0 | 1 | 1 | 0 | 0 | 1 | 1 | 1 | 1 | 2 |
| Part 2 cand | 0 | 1 | 2 | 1 | 0 | 3 | 4 | 0 | 0 | 0 | 2 | 2 | 2 | 4 | 3 | 3 | 4 | 4 | 3 | 1 |
| triangle_idx | 20 | 21 | 22 | 23 | 24 | 25 | 26 | 27 | 28 | 29 | 30 | 31 | 32 | 33 | 34 | 35 | 36 | 37 | 38 | 39 |
| triangle dir | 1 | 0 | 0 | 1 | 1 | 1 | 1 | 1 | 1 | 1 | 0 | 0 | 1 | 0 | 1 | 0 | 0 | 1 | 0 | 0 |
| Part 1 cand | 2 | 2 | 4 | 3 | 3 | 3 | 4 | 3 | 2 | 4 | 4 | 2 | 4 | 3 | 4 | 3 | 2 | 2 | 4 | 3 |
| Part 2 cand | 0 | 1 | 3 | 0 | 2 | 4 | 0 | 1 | 3 | 1 | 1 | 3 | 2 | 2 | 3 | 1 | 4 | 4 | 2 | 4 |

The first row (triangle_idx) of Table 4 indicates the triangular partition indices ranging from 0 to 39. The second row (triangle dir) of Table 4 indicates possible split directions represented by 0 or 1. The third row (Part 1 cand) includes possible first merge indices corresponding to a first triangular prediction unit and ranging from 0 to 4. The fourth row (Part 2 cand) includes possible second merge indices corresponding to a second triangular prediction unit and ranging from 0 to 4.

For example, when a triangular partition index having a value of 1 is received at a decoder, based on a column of the lookup table corresponding to triangle_idx=1, it can be determined that the split direction is a partition direction represented by the value of 1 (e.g., the anti-diagonal split), and the first and second merge indices are 0 and 1, respectively. As the triangle partition indices are associated with a lookup table, a triangle partition index is also referred to as a table index in this disclosure.

5.2 Adaptive Blending Along the Triangular Partition Edge

In an embodiment, after predicting each triangular prediction unit using respective motion information, a blending process is applied to the two prediction signals of the two triangular prediction units to derive samples around the diagonal or anti-diagonal edge. The blending process adaptively chooses between two groups of weighting factors depending on the motion vector difference between the two triangular prediction units. In an embodiment, the two weighting factor groups are as follows:
 (1) First weighting factor group: {7/8, 6/8, 4/8, 2/8, 1/8} for samples of a luma component and {7/8, 4/8, 1/8} for samples of chroma component; and
 (2) Second weighting factor group: {7/8, 6/8, 5/8, 4/8, 3/8, 2/8, 1/8} for samples of a luma component and {6/8, 4/8, 2/8} for samples of a chroma component.

The second weighting factor group has more luma weighting factors and blends more luma samples along the partition edge.

In an embodiment, the following condition is used to select one of the two weighting factor groups. When reference pictures of the two triangle partitions are different from each other, or when a motion vector difference between the two triangle partitions is greater than a threshold (e.g., 16 luma samples), the second weighting factor group can be selected. Otherwise, the first weighting factor group can be selected.

Figure 16A:
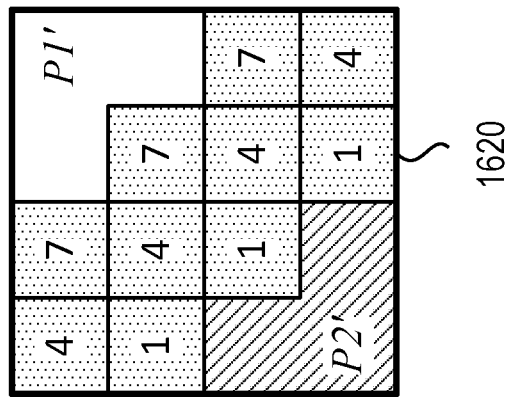
FIG. 16A shows an example of a coding unit applying a set of weights in an adaptive blending process in accordance with an embodiment.
Figure 16A:
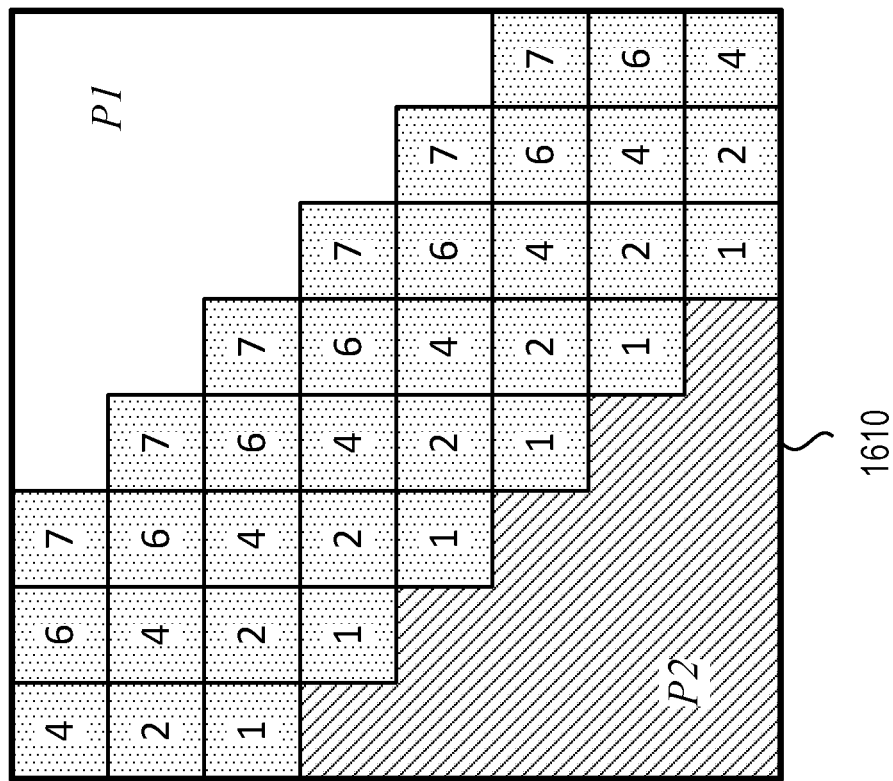

FIG. 16A shows an example of a coding unit applying the first set of weighting factors in an adaptive blending process in accordance with an embodiment. In FIG. 16A, a first coding block (1610) includes luma samples of a CU, and a second coding block (1620) includes chroma samples of the same CU. Each of the blocks is split into two triangular partitions P1, P2, P1', and P2'. A set of pixels along a diagonal edge in the coding block (1610) or (1620) are labeled with the numbers 1, 2, 4, 6, and 7 corresponding to the weighting factors 1/8, 2/8, 4/8, 6/8, and 7/8, respectively, for partition P1 or partition P1'; and the weighting factors 7/8, 6/8, 4/8, 2/8, and 1/8, respectively, for partition P2 or partition P2'. For example, for a pixel labelled with the number of 2, a sample value of the pixel after a blending operation can be obtained according to:

the blended sample value=2/8×S1+6/8×S2,   (Equation 3)

where S1 and S2 represent sample values at the respective pixel but belonging to predictions of a first triangular prediction unit P1 and a second triangular prediction unit P2, respectively.

Moreover, the blank region without any weight represents that the predicted samples according to the triangular partition P1 (or P1') are adopted without merging. Similarly, the shaded region without any weight represents that the predicted samples according to the triangular partition P2 are adopted without merging.

Figure 16B:
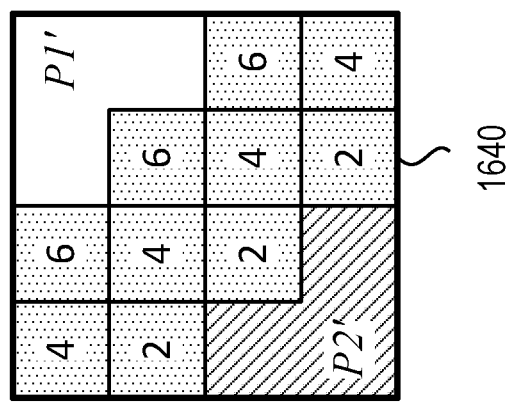
FIG. 16B shows an example of a coding unit applying a set of weights in an adaptive blending process in accordance with an embodiment.
Figure 16B:
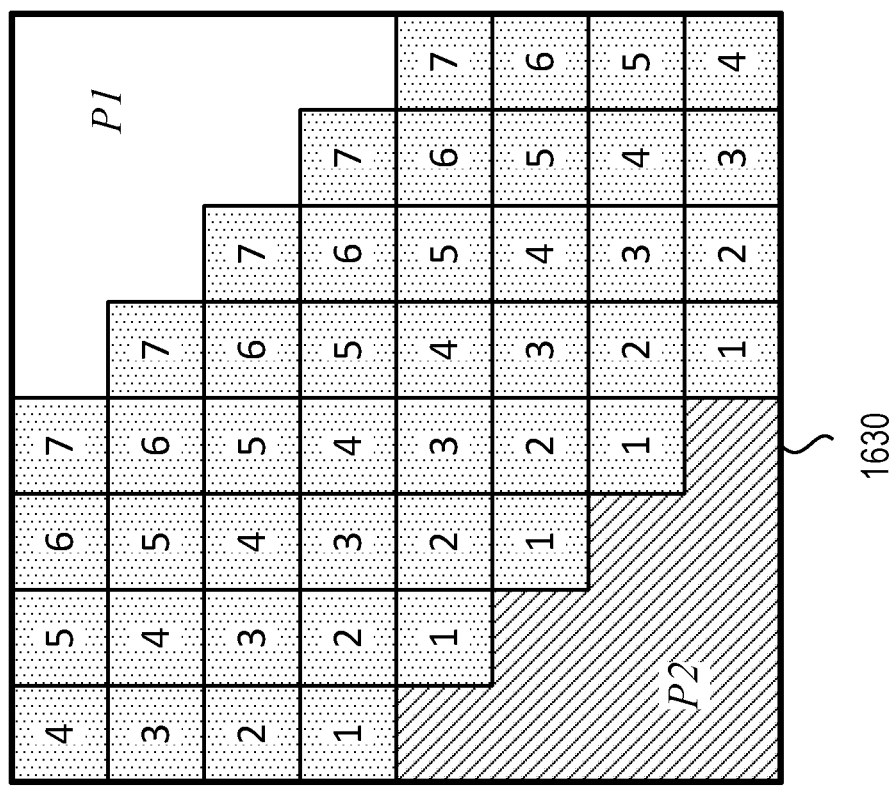

FIG. 16B shows an example of a coding unit applying a second set of weighting factors in an adaptive blending process in accordance with an embodiment. In FIG. 16B, a third coding block (1630) includes luma samples of a CU, and a fourth coding block (1640) includes chroma samples of the same CU. Each of the blocks is split into two triangular partitions P1, P2, P1', and P2'. A set of pixels along a diagonal edge in the coding block (1630) or (1640) are labeled with the numbers 1, 2, 3, 4, 5, 6, and 7 corresponding to the weighting factors 1/8, 2/8, 3/8, 4/8, 5/8, 6/8, and 7/8, respectively, for partition P1 or partition P1'; and the weighting factors 7/8, 6/8, 5/8, 4/8, 3/8, 2/8, and 1/8, respectively, for partition P2 or partition P2'. Also, the blank region without any weight represents that the predicted samples according to the triangular partition P1 (or P1') are adopted without merging. Similarly, the shaded region without any weight represents that the predicted samples according to the triangular partition P2 are adopted without merging.

6. Combined Inter and Intra Prediction (CIIP)

In some embodiments, when a CU is coded in merge mode, and if the CU contains at least 64 luma samples (e.g., a product of the CU width times the CU height is equal to or greater than 64), an additional flag can be signaled to indicate if a combined inter and intra prediction (CIIP) mode is applied to the current CU.

In some embodiments when the CIIP mode is applied, an intra prediction mode is first derived, where up to four possible intra prediction modes can be used, including a DC, planar, horizontal, or vertical mode. Afterwards, predicted samples for prediction blocks are derived according to the inter prediction and intra prediction signals, respectively (i.e., a set of inter predicted samples and a set of intra predicted samples), in a manner similar to regular intra and inter prediction processes. Finally, the set of inter predicted samples and the set of intra predicted samples can be combined according to a weighted averaging process to obtain a set of CIIP predicted samples.

6.1 Intra Prediction Mode Derivation

In an embodiment, up to 4 intra prediction modes, including the DC, Planar, Horizontal, and Vertical modes, can be used to predict the luma component in the CIIP mode. In some embodiments, if the CU shape is very wide (that is, the width of the CU is more than two times of height of the CU), the horizontal mode may not be allowed. In some embodiments, if the CU shape is very narrow (that is, the height of the CU is more than two times of the width of the CU), the vertical mode may not be allowed.

In some embodiments, the CIIP mode can use three most probable modes (MPM) for intra prediction. The CIIP MPM candidate list can be formed as follows:
 (i) The left and top neighboring blocks are set as A and B, respectively;
 (ii) The intra prediction modes of block A and block B, denoted as intraModeA and intraModeB, respectively, are derived as follows:
  a. Let X be either A or B,
  b. intraModeX is set to DC if (1) block X is not available; or (2) block X is not predicted using the CIIP mode or the intra mode; or (3) block X is outside of the current CTU, and
  c. otherwise, intraModeX is set to (1) DC or Planar if the intra prediction mode of block X is DC or Planar; or 2) Vertical if the intra prediction mode of block X is a "Vertical-like" angular mode (e.g., having a mode number greater than 34 in some examples where 66 angular modes are implemented), or (3) Horizontal if the intra prediction mode of block X is a "Horizontal-like" angular mode (e.g., having a mode number less than or equal to 34 in some examples where 66 angular modes are implemented);
 (iii) If intraModeA and intraModeB are the same:
  a. If intraModeA is Planar or DC, then the three MPMs are set to {Planar, DC, Vertical} in that order, and
  b. Otherwise, the three MPMs are set to {intraModeA, Planar, DC} in that order; and (iv) Otherwise (intraModeA and intraModeB are different):
 a. The first two MPMs are set to {intraModeA, intraModeB} in that order, and
 b. Uniqueness of Planar, DC, and Vertical is checked in that order against the first two MPM candidate modes; as soon as a unique mode is found, it is added as the third MPM.

In some embodiments, if the CU shape is very wide or very narrow as defined above, the MPM flag can be inferred to be 1 without signaling. Otherwise, an MPM flag can be signaled to indicate if the CIIP intra prediction mode is being used.

In some embodiments, if the MPM flag is 1, an MPM index can be further signaled to indicate which one of the MPM candidate modes is used in the CIIP intra prediction. Otherwise, if the MPM flag is 0, the intra prediction mode can be set to a "missing mode" among the MPM candidates described above that is not included in the MPM candidate list. For example, since four possible intra prediction modes are considered in the CIIP intra prediction mode, and the MPM candidate list contains only three intra prediction modes, one of the four possible modes can be the missing mode. For example, if the Planar mode is not in the MPM candidate list, then Planar is the missing mode, and the intra prediction mode can be set to Planar.

For the chroma components, the DM mode can be applied without additional signaling. Therefore, in some examples, chroma components use the same prediction mode as the corresponding luma components.

In some embodiments, the intra prediction mode of a CIIP-coded CU can be saved and used in the intra mode coding of the future neighboring CUs.

6.2 Combining Inter and Intra Predicted Samples

In an embodiment, the set of inter predicted samples in the CIIP mode $P_{inter}$ is derived using the same inter prediction process applied to regular merge mode, and the set of intra predicted samples $P_{intra}$ is derived using the CIIP intra prediction mode following the regular intra prediction process. Then, the intra and inter predicted samples can be combined using weighted averaging to obtain a set of CIIP predicted samples Paw, where the weights can depend on the intra prediction mode and where the sample is located in the coding block.

In some embodiments, if the intra prediction mode is the DC or Planar mode, or if the block width or height is smaller than 4 pixels, equal weights can be applied to the set of intra predicted samples and the set of inter predicted samples. Otherwise, the weights can be determined based on the intra prediction mode (either Horizontal mode or Vertical mode in some cases) and the sample location in the block. For example, when the intra prediction mode is the Horizontal prediction mode, the coding block can be split into four equal-area parts of a size of (W/4)×H, W being the width of the block and H being the height of the block. Starting from the part closest to the intra prediction reference samples and ending at the part farthest away from the intra prediction reference samples, the weight wt for the set of intra predicted samples each of the 4 regions can be set to 6, 5, 3, and 2, respectively, with a total weight being 8. The weights for the Vertical mode are derived similarly but the coding block is split into four equal-area parts of a size of W×(H/4).

With the derived weight wt for the set of intra predicted samples, in this example, the combined CIIP prediction image can be derived according to:

$$P_{CIIP}=((8-wt)\times P_{inter}+wt\times P_{intra}+4)>>3 \quad \text{(Equation 4)}$$

III. Interweaved Affine Prediction

Figure 17:
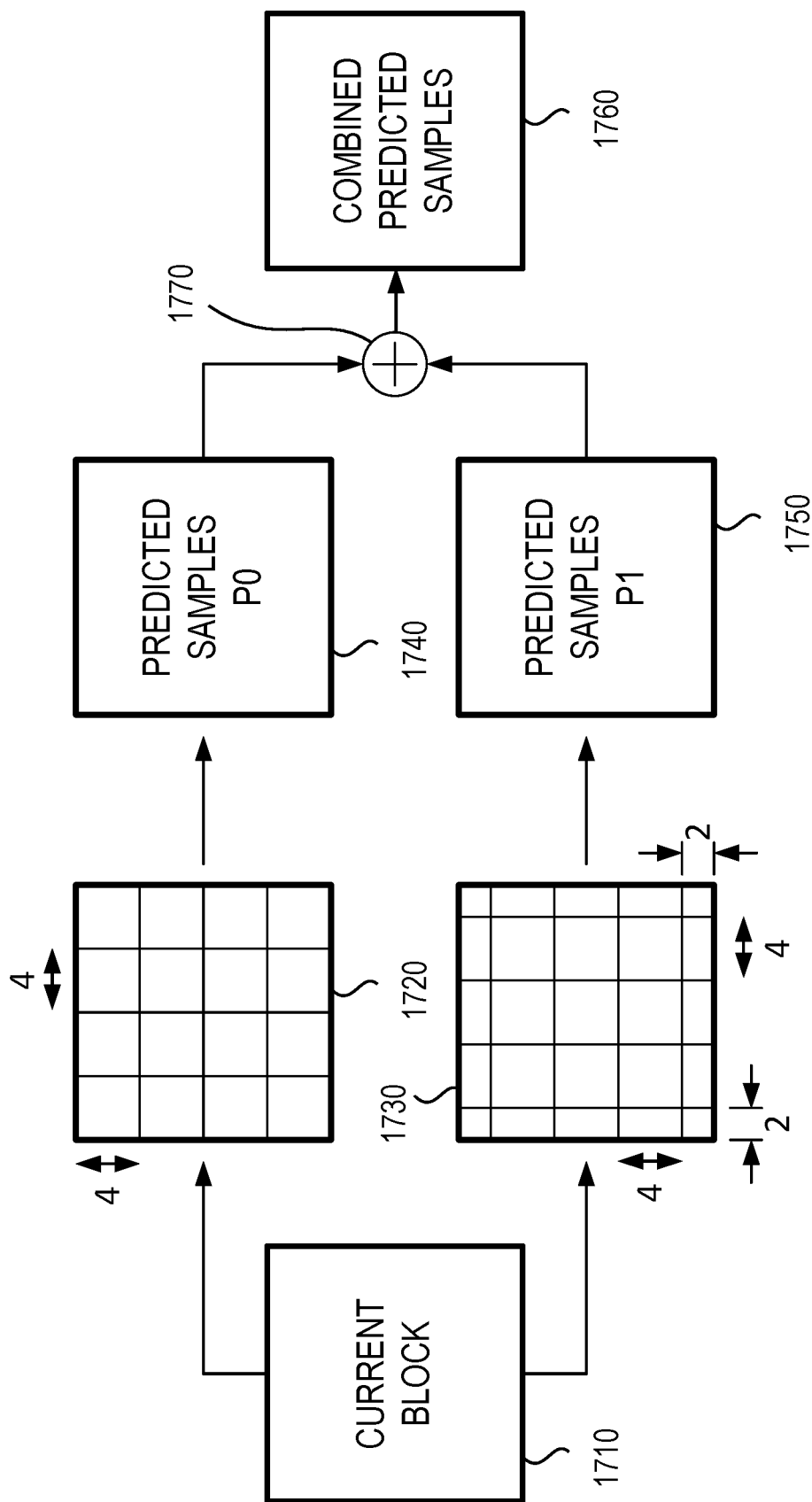
FIG. 17 is shows an interweaved affine prediction method in accordance with an embodiment.

In some embodiments, interweaved affine prediction is used. FIG. 17 shows an interweaved affine prediction method in accordance with an embodiment. As shown in FIG. 17, a current block (1710) with a size of 16×16 samples is divided into sub-blocks with two different dividing patterns, including first sub-blocks (1720) based on Pattern 0 and second sub-blocks (1730) based on Pattern 1. With Pattern 0, the current block (1710) is divided into first sub-blocks (1720) with an equal size of 4×4. In contrast, Pattern 1 is shifted by an offset (e.g., 2×2 offset) with respect to Pattern 0. Two sets of auxiliary predicted samples, including a set of predicted samples P0 (1740) and a set of predicted samples P1 (1750), corresponding to first sub-blocks (1720) and second sub-blocks (1730) are generated by affine motion compensation (AMC). For example, an affine model can be determined from an affine merge candidate on a sub-block based merge candidate list. A sub-block MV for each sub-block from the first sub-blocks (1720) and the second sub-blocks (1730) can be derived based on the affine model. In some embodiments, the sub-block MVs can be determined according to center positions of the respective sub-blocks.

Thereafter, a set of combined predicted samples (1760) can be calculated by combining the two sets of predicted samples P0 (1740) and P1 (1750). For example, a weighted average operation (1770) can be performed to calculate a weighted average of two corresponding samples (denoted by $P_0$ and $P_1$) in the two prediction images P0 (1740) and P1 (1750) pixel by pixel according to:

$$\begin{cases} P = (P_0 + P_1) \gg 1, & \text{if } w_0 = w_1, \\ P = (w_0 P_0 + w_1 P_1) \gg 2, & \text{otherwise,} \end{cases} \quad \text{(Equation 5)}$$

where $\omega_0$ and $\omega_1$ are the weights corresponding to the pair of collocated samples in the two sets of predicted samples P0 (1740) and P1 (1750), respectively. A total weight ($\omega_0+\omega_1$) is four in one embodiment.

Figures 18A, 18B:
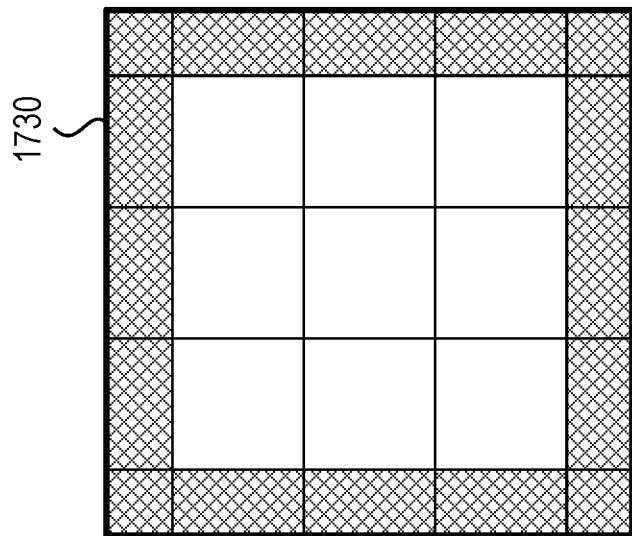
FIG. 18A shows an example of a set of weights for a sub-block in an interweaved affine prediction method in accordance with an embodiment.
FIG. 18B is a schematic illustration of a pattern for dividing a block into sub-blocks in an interweaved affine prediction method in accordance with an embodiment.

FIG. 18A shows an example of a set of weights for a sub-block in an interweaved affine prediction method in accordance with an embodiment. In an embodiment, the weight of each sample in the weighted average operation (1770) can be set according to a pattern (1800) shown in FIG. 18A. The pattern (1800) includes 16 samples included in a sub-block (e.g., a 4×4 sub-block in FIG. 17). Four prediction samples located near the center of the sub-block are associated with a weight value of 3, while 12 prediction samples located at the boundary of the sub-block are associated with a weight value of 1. Depending on a position of a sample within a sub-block, a weight corresponding to the sample can be determined based on the pattern (1800).

FIG. 18B is a schematic illustration of a pattern for dividing a block into sub-blocks in an interweaved affine prediction method in accordance with an embodiment. In an embodiment, to avoid block motion compensation on small sub-blocks, the interweaved prediction can only be applied on regions where the size of sub-blocks meets a threshold such as 4×4 for both the two dividing patterns as shown in FIG. 17. For example, in the shaded area of the second sub-blocks (1730) as shown in FIG. 18B, no interweaved prediction is applied, and in the non-shaded area of the second sub-blocks (1730), the interweaved prediction is applied.

In an embodiment, an interweaved prediction is applied on chroma components as well as the luma component. In some embodiments compared with other prediction methods, the interweaved prediction can be implemented without increasing a memory access bandwidth, since an area of a reference picture used for the AMC for all sub-blocks can be fetched together as a whole, and therefore no additional reading operation is needed.

Further, for flexibility, a flag can be signaled (e.g., in slice header) to indicate whether the interweaved prediction is used or not. In an example, the flag is always signaled to be 1. In various embodiments, interweaved affine prediction can be applied on uni-predicted affine blocks, or on both uni-predicted and bi-predicted affine blocks.

IV. Stacked Affine Prediction

1. Overview

Figure 19:
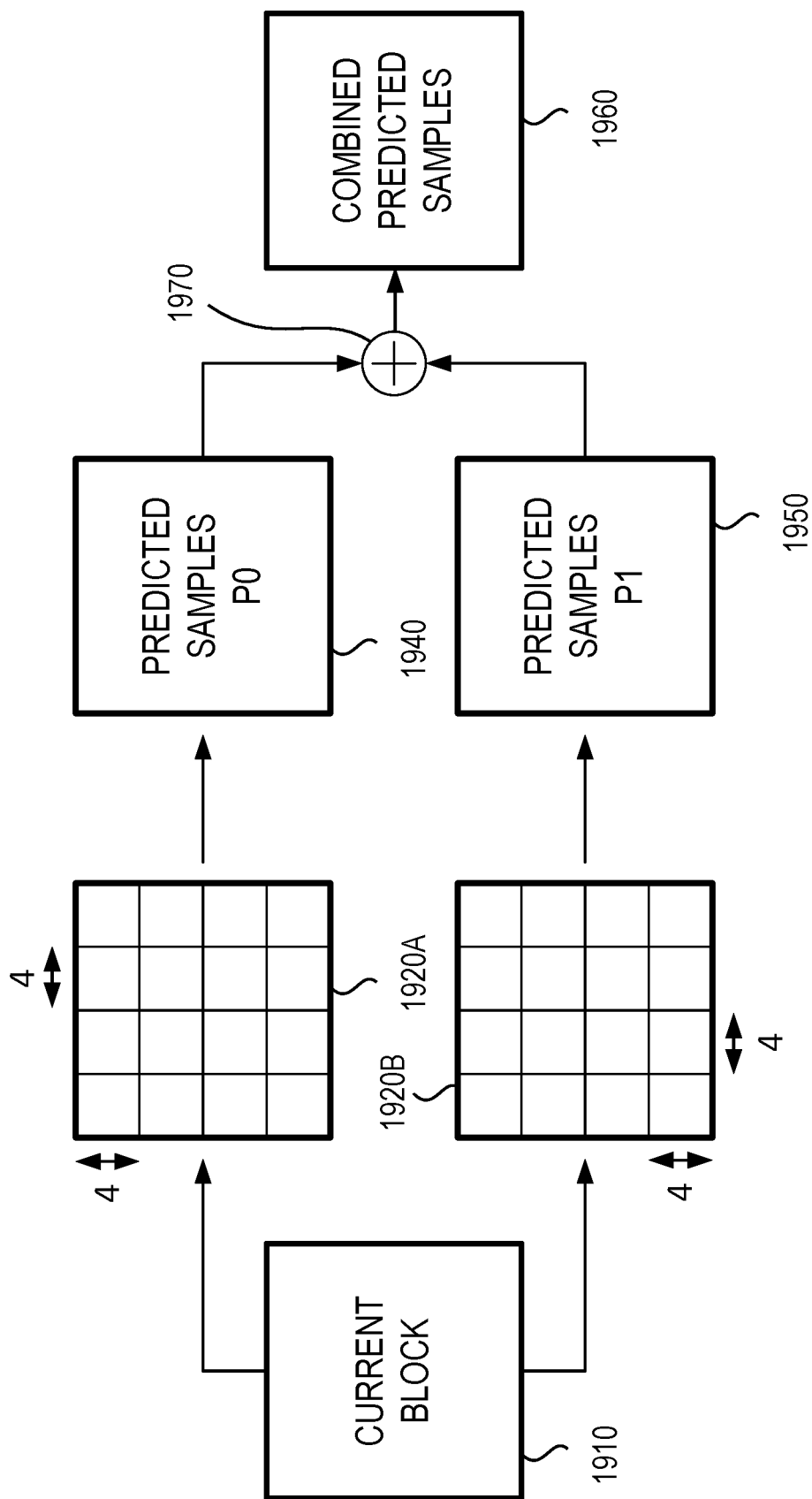
FIG. 19 is shows a stacked affine prediction method in accordance with an embodiment.

In some embodiments, the interweaved affine prediction method as described above can be modified to become a stacked affine prediction. The stacked affine prediction can be used to achieve improved compression efficiency. FIG. 19 shows a stacked affine prediction method in accordance with an embodiment. As shown in FIG. 19, a current block (1910) with a size (e.g., of 16×16 samples) can be divided into sub-blocks according to a dividing pattern for two auxiliary predictions, including sub-blocks (1920A) for a first auxiliary prediction and the same sub-blocks (1920B) for a second auxiliary prediction, where the current block (1910) is divided into the sub-blocks with an equal size (e.g., of 4×4). In some embodiments, an affine model for the current block (1910) can be determined as described above with reference to FIGS. 12A-12C, 13.

In the stacked affine prediction method, two different sets of sub-block motion vectors (e.g. Affine MV set 0 and Affine MV set 1) can be derived using the affine model for the sub-blocks (1920A) for the first auxiliary prediction and the second sub-blocks (1920B) for the second auxiliary prediction. In some embodiments, at least one sub-block motion vector for one of the sub-blocks is different from a second motion vector for the one of the sub-blocks.

Figure 20:
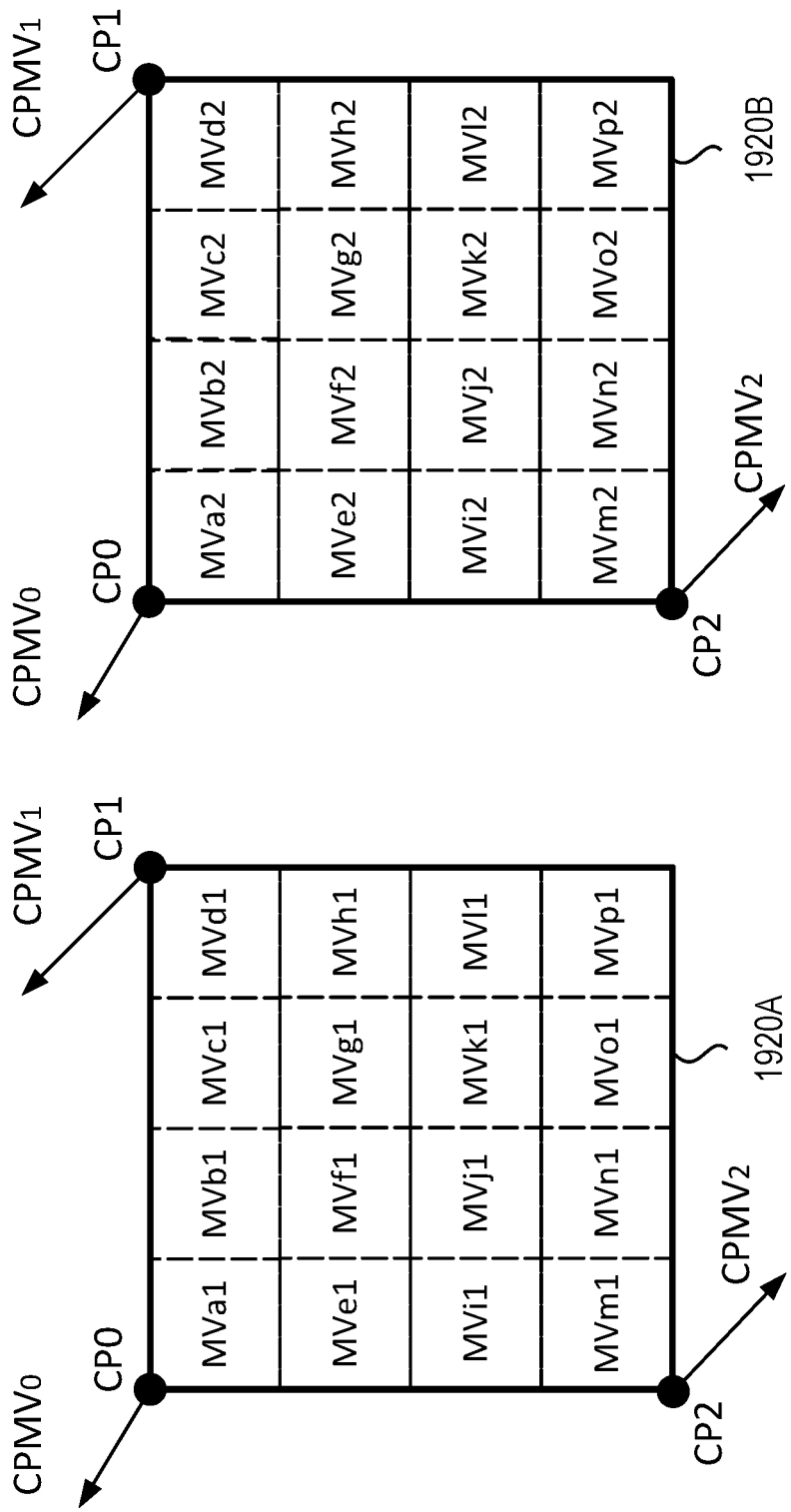
FIG. 20 is a schematic illustration of two sets of motion vectors for a same set of sub-blocks of a current block coded according to a stacked affine prediction method in accordance with one embodiment.

FIG. 20 is a schematic illustration of two sets of motion vectors for a same set of sub-blocks of a current block coded according to a stacked affine prediction method in accordance with one embodiment. For the sub-blocks (1920A) for the first auxiliary prediction, sub-block MVs (MVa1-MVp1) for each of the sub-blocks can be derived according to an affine model defined by three control points (CP0, CP1, and CP2) and corresponding control point motion vectors ($CPMV_0$, $CPMV_1$, and $CPMV_2$). For the sub-blocks (1920B) for the second auxiliary prediction, sub-block MVs (MVa2-MVp2) for each of the sub-block can be derived according to the same affine model defined by the same three control points (CP0, CP1, and CP2) and the same corresponding control point motion vectors ($CPMV_0$, $CPMV_1$, and $CPMV_2$). In some embodiments, the sub-block MVs (MVa1-MVp1) for the sub-blocks (1920A) (e.g., Affine MV set 0) can be determined as MVs corresponding to a first relative position in each sub-block. In some embodiments, the sub-block MVs (MVa2-MVp2) for the sub-blocks (1920B) (e.g., Affine MV set 1) can be determined as MVs corresponding to a second relative position in each sub-block. In some embodiments, the sub-block MVs (MVa2-MVp2) for the sub-blocks (1920B) (e.g., Affine MV set 1) can be determined by processing the sub-block MVs (MVa1-MVp1).

Two sets of auxiliary predicted samples, including a set of predicted samples P0 (1940) and a set of predicted samples P1 (1950), corresponding to the sub-blocks (1920A) for the first auxiliary prediction and the sub-blocks (1920B) for the second auxiliary prediction, respectively, are generated by affine motion compensation (AMC). For example, an affine model can be determined from an affine merge candidate on a sub-block based merge candidate list. In some embodiments, a same reference index can be shared, and thus a same reference picture can be used, for generating the sets of auxiliary predicted samples.

Thereafter, a set of combined predicted samples (1960) can be calculated by combining the two sets of predicted samples P0 (1940) and P1 (1950). For example, a weighted average operation (1970) can be performed to calculate a weighted average of two corresponding samples (denoted by $P_0$ and $P_1$) in the two sets of predicted samples P0 (1940) and P1 (1950) pixel by pixel according to:

$$\begin{cases} P = (P_0 + P_1) \gg 1, & \text{if } w_0 = w_1, \\ P = (w_0 P_0 + w_1 P_1) \gg 2, & \text{otherwise}, \end{cases} \quad \text{(Equation 6)}$$

where $\omega_0$ and $\omega_1$ are the weights corresponding to the pair of collocated samples in the two sets of predicted samples P0 (1740) and P1 (1750), respectively. A total weight ($\omega_0+\omega_1$) is four for example.

2. Embodiments for Sub-Block MV Derivation and Motion Compensation

In some embodiments, one affine MV set (e.g. Affine MV set 0) can be derived from the CPMVs according to the affine mode as MVs corresponding to a first relative position in each sub-block. In some embodiments, the other affine MV set (e.g. Affine MV set 1) can be derived from the CPMVs according to the affine mode as MVs corresponding to a second relative position in each sub-block.

In some embodiments, the first relative position (e.g., POS0) is a center of each sub-block, and the second relative position (e.g., POS1) is a position other than the center of each sub-block. In one example, the second relative position (e.g., POS1) corresponds to an upper-left sample of each sub-block. In one example, the second relative position (e.g., POS1) corresponds to an upper-right sample of each sub-block. In one example, the second relative position (e.g., POS1) can be adaptively selected from the upper-left sample, the upper-right sample, or the lower-left sample of each sub-block, for example according to the CPMV values.

In one example, the second relative position (e.g., POS1) corresponds to an upper-left corner of each sub-block. In one example, the second relative position (e.g., POS1) corresponds to an upper-right corner of each sub-block. In one example, the second relative position (e.g., POS1) can be adaptively selected from the upper-left corner, the upper-right corner, or the lower-left corner of each sub-block, according to the CPMV values.

In some embodiments, relative positions POS0 and POS1 can be inside the sub-block, on the boundary of the sub-block, or shared by neighboring sub-blocks. In some embodiments, relative positions POS0 and POS1 can be symmetric with respect to one of a vertical line, a horizontal line, and a diagonal line intersecting a center of each sub-block.

In one example for luma components, the relative position POS0 is (2, 0) with respect to the upper-left corner of each sub-block, and the relative position POS1 is (2, 3) with respect to the upper-left corner of each sub-block.

In another example for luma components, the relative position POS0 is (0, 2) with respect to the upper-left corner of each sub-block, and the relative position POS1 is (3, 2) with respect to the upper-left corner of each sub-block.

In another example for luma components, the relative position POS0 is (0, 0) with respect to the upper-left corner of each sub-block, and the relative position POS1 is (3, 3) with respect to the upper-left corner of each sub-block.

In another example for luma components, the relative position POS0 is (0, 3) with respect to the upper-left corner of each sub-block, and the relative position POS1 is (3, 0) with respect to the upper-left corner of each sub-block.

In another example for luma components, the relative position POS0 is (1, 1) with respect to the upper-left corner of each sub-block, and the relative position POS1 is (2, 2) with respect to the upper-left corner of each sub-block.

In another example for luma components, the relative position POS0 and the relative position POS1 can be adaptively determined, for example according to the values of the CPMVs.

In one particular example for luma components, the relative position POS0 is (0, 2) with respect to the upper-left corner of each sub-block, and the relative position POS1 is (4, 2) with respect to the upper-left corner of each sub-block. In this example, the sub-block MV at POS1 for a particular sub-block is indeed also used as the sub-block MV at POS0 for a neighboring sub-block. In this example, the stacked affine prediction method may be simplified as further illustrated with reference to FIG. 21.

Figure 21:
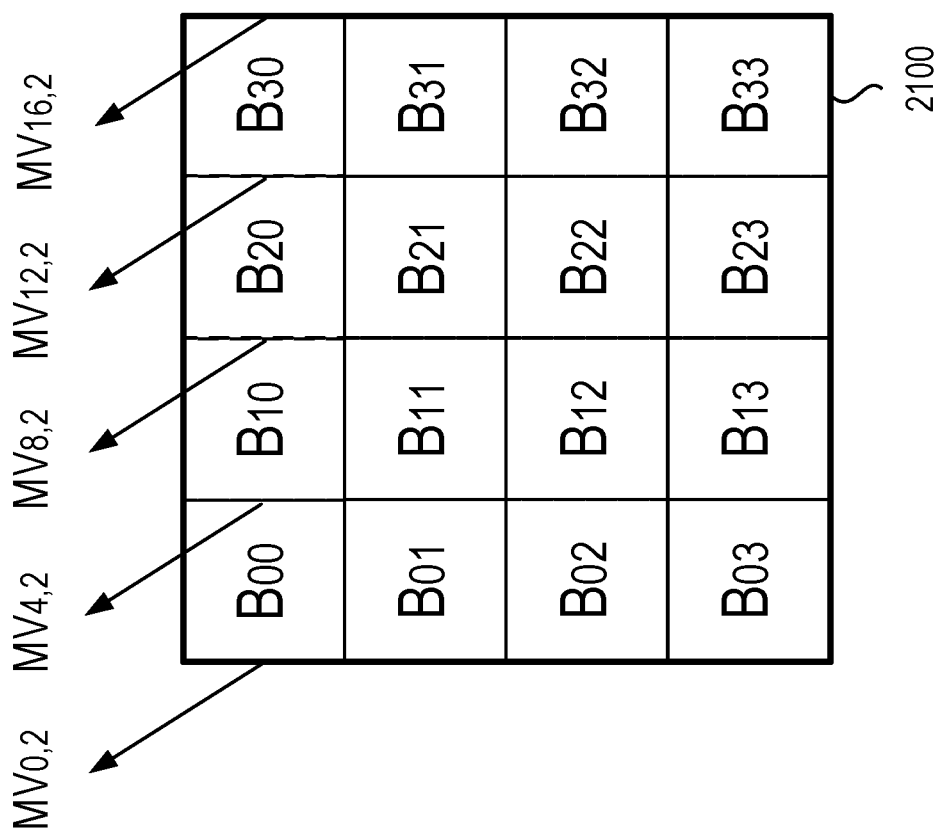
FIG. 21 is a schematic illustration of coding a particular block according to a stacked affine prediction method in accordance with an embodiment.

FIG. 21 is a schematic illustration of coding a particular block according to a stacked affine prediction method in accordance with an embodiment. As shown in FIG. 21, a 16×16 affine block (2100) can be divided into 16 sub-blocks of a size of 4×4 ($B_{00}$, $B_{01}$, $B_{02}$, $B_{03}$, $B_{10}$, $B_{11}$, $B_{12}$, $B_{13}$, $B_{20}$, $B_{21}$, $B_{22}$, $B_{23}$, $B_{30}$, $B_{31}$, $B_{32}$, and $B_{33}$). Sub-block MVs ($MV_{0,2}$, $MV_{4,2}$, $MV_{8,2}$, $MV_{12,2}$, and $MV_{16,2}$) are derived for sub-blocks ($B_{00}$, $B_{10}$, $B_{20}$, and $B_{30}$) at position (0, 2), (4, 2), (8, 2), (12, 2), and (16,2) with respect to the upper-left corner of the block (2100), respectively.

The prediction of a sub-block can be generated according to two sub-block MVs associated with the sub-block at (0, 2) and (4, 2) with respect to the upper-left corner of each sub-block, which correspond to a center of a left edge and a center of a right edge of each sub-block. For example, $MV_{0,2}$ and $MV_{4,2}$ are used for sub-block Boo, and $MV_{4,2}$ and $MV_{8,2}$ are used for sub-block $B_{10}$. As the sub-block MVs may be shared by neighboring sub-blocks, the generation of a 4×4 prediction block of sub-block ($B_{00}$) according to $MV_{4,2}$ and the generation of a 4×4 prediction block of sub-block ($B_{10}$) according to $MV_{4,2}$ can be merged into generation of a 8×4 prediction block according $MV_{4,2}$. In some embodiments, since the per pixel prediction complexity of an 8×4 block is smaller than that of 4×4 block, the proposed method can reduce prediction complexity. For example, for a bi-predicted affine block with N 4×4 sub-blocks in a row, the proposed method needs (N−1) 8×4 prediction blocks and two 4×4 prediction blocks for the row. In contrast, N×2 4×4 prediction blocks are needed for that row if the process is implemented without the simplification as described above.

Moreover, in some embodiments, one affine MV set (e.g. Affine MV set 0) can be derived from the CPMVs according to the affine mode as MVs corresponding to a relative (or predetermined relative) position in each sub-block, such as a center of each sub-block. In some embodiments, the other affine MV set (e.g. Affine MV set 1) can be determined by processing the Affine MV set 0. For example, the Affine MV set 1 can be obtained by applying a motion vector offset ΔMV to the Affine MV set 0.

3. Embodiments for Weighted Average on Auxiliary Predicted Samples

In one embodiment, equal weights may be used for the averaging of the two sets of auxiliary predicted samples. In another embodiment, when a sub-block MV is derived based on a position that is not at the center of the sub-block, a greater weight can be assigned to a pixel that is closer to the corresponding relative position for deriving the sub-block MV than a pixel that is farther away from the corresponding relative position.

FIGS. 22A-22E shows various examples of assigning weights for a sub-block in a stacked affine prediction method in accordance with one or more embodiments. In these examples, each sub-block has a size of 4×4 pixels.

In some embodiments, a pixel in a set of predicted samples for a sub-block has a weight of three over a total weight of four when the pixel is located less than three pixels away from the first relative position along a horizontal direction or a vertical direction, and a weight of one over the total weight of four when the pixel is located three or more pixels away from the first relative position along the horizontal direction or the vertical direction.

In one example as shown in FIG. 22A, when the sub-block MV is derived according to the upper-left position (2210) of the sub-block, the upper-left four pixels of the sub-block can be assigned to a weight of 3, and the other pixels can be assigned to a weight of 1, with a total weight for the weighted averaging process is 4.

In one example as shown in FIG. 22B, when the sub-block MV is derived according to the upper-right position (2220) of the sub-block, the upper-right four pixels of the sub-block can be assigned to a weight of 3, and the other pixels can be assigned to a weight of 1, with a total weight for the weighted averaging process is 4.

In one example as shown in FIG. 22C, when the sub-block MV is derived according to the lower-left position (2230) of the sub-block, the lower-left four pixels of the sub-block can be assigned to a weight of 3, and the other pixels can be assigned to a weight of 1, with a total weight for the weighted averaging process is 4.

In one example as shown in FIG. 22D, when the sub-block MV is derived according to the center of a left-edge position (2240) of the sub-block, the left eight pixels of the sub-block can be assigned to a weight of 3, and the other pixels can be assigned to a weight of 1, with a total weight for the weighted averaging process is 4.

In one example as shown in FIG. 22E, when the sub-block MV is derived according to the center of a right-edge position (2240) of the sub-block, the right eight pixels of the sub-block can be assigned to a weight of 3, and the other pixels can be assigned to a weight of 1, with a total weight for the weighted averaging process is 4.

In one embodiment, the stacked affine prediction may be applied only when the current block is uni-predicted (e.g., only one reference picture is used). In one embodiment, the stacked affine prediction may be applied for both uni-predicted and bi-predicted blocks. In some embodiments, when the current block is bi-predicted, the stacked affine prediction can be applied to the motion compensation from a reference picture of each prediction direction.

In some embodiments, when the stacked affine prediction is used, no deblocking inside the block is performed on the current block. In at least one embodiment, when the stacked affine prediction is used, deblocking inside the current block can still be performed.

In some embodiments, a generalized bi-prediction (GBi) index may be used in conjunction with the stacked affine prediction, even when the stacked affine prediction uses only one reference direction. In this example, the GBi index may be signaled to specify the weights for combining the two sets of auxiliary predicted samples. In one embodiment, when the GBi index is used on a block coded according to the stacked affine prediction, the weighted average can only be performed according to the GBi index. In this case, other sub-block based weighted averaging may not be performed.

4. Signaling of Stacked Affine Prediction

In some embodiments, a flag such as a stacked affine prediction flag (e.g., stacked_affine_flag) may be signaled. The flag can be signaled by high-level signaling (such as, but not limited to, at a slice, tile, tile-group, picture, or sequence level, etc.) to indicate whether the stacked affine prediction method is used.

In one embodiment, a flag such as sps_stacked_affine_flag can be signaled at the SPS level. If this flag is true, a picture level or tile group level flag (e.g., picture_stacked_affine_flag) can be signaled to indicate whether the stacked affine prediction method is used for the current decoded picture or tile group.

In one embodiment, the stacked affine prediction flag (e.g., stacked_affine_flag) can be signaled at a level which is lower than the sequence level, such as at a picture level, tile group level, tile level, or block level, etc. In such case, the flag stacked_affine_flag may be signaled only when an affine prediction enable flag signaled at the sequence level is true. When the affine prediction enable flag is signaled as false at the sequence level, the flag stacked_affine_flag can be inferred as false.

In one embodiment, the enable status of the stacked affine prediction method may be derived by other approaches, such as a predefined default setting, etc., and may not necessarily be signaled.

In some embodiments, when the stacked affine prediction method is enabled and only applied to affine uni-prediction, the following variations may be implemented.

In one example, when the stacked affine prediction method is enabled for a coding region (such as a picture or a tile group), as indicated by a corresponding high level enable flag, only uni-predicted affine blocks are coded using the stacked affine prediction method, and bi-predicted affine blocks are coded using regular affine bi-prediction. In such a case, the CU level syntax elements with respect to inter prediction direction are not modified, and the semantic and/or the binarization of inter prediction direction index is also not modified.

In one embodiment, when the stacked affine prediction method is enabled for a coding region (such as a picture or a tile group), as indicated by a corresponding high level flag, only uni-prediction is allowed for affine coded blocks. In this example, bi-prediction can be disabled for affine coded blocks for the same coding region. In such case, the semantic with respect to inter prediction direction, such as inter_pred_idc, may be modified to save bits.

Figure 23:
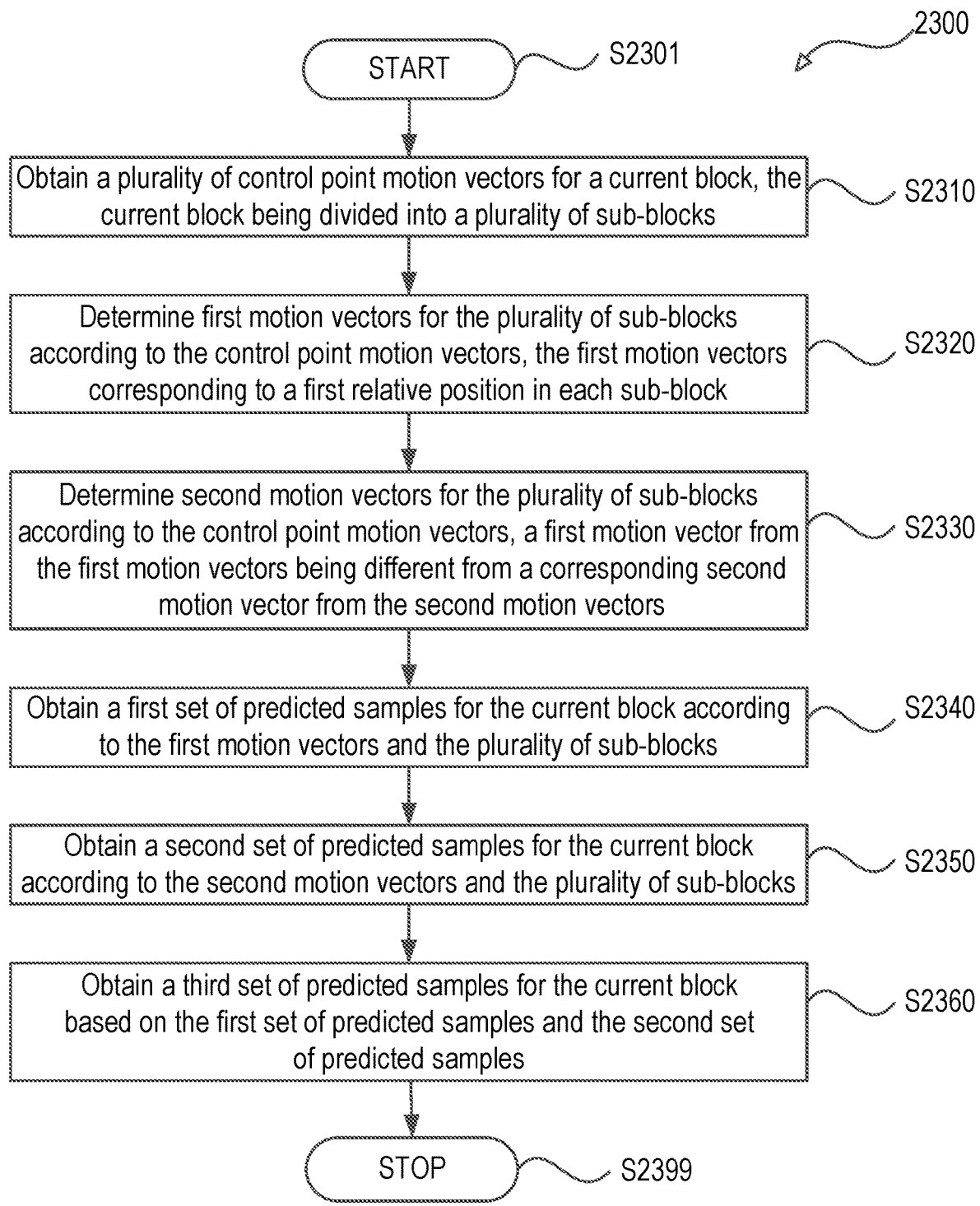
FIG. 23 shows a flow chart outlining a process according to some embodiments of the disclosure.

FIG. 23 shows a flow chart outlining a process (2300) according to some embodiments of the disclosure. The process (2300) can be used in encoding or decoding a current block of a current picture, including obtaining a set of predicted samples for a current block according to a stacked affine prediction method. In some embodiments, one or more operations are performed before or after process (2300), and some of the operations illustrated in FIG. 23 may be reordered or omitted.

In various embodiments, the process (2300) is executed by processing circuitry, such as the processing circuitry in the terminal devices (210), (220), (230) and (240), the processing circuitry that performs functions of the video decoder (310), the processing circuitry that performs functions of the video decoder (410), and the like. In some embodiments, the process (2300) is implemented in software instructions, thus when the processing circuitry executes the software instructions, the processing circuitry performs the process (2300). The process starts at (S2301) and proceeds to (S2310).

At (S2310), a plurality of control point motion vectors for a current block is obtained. The current block is divided into a plurality of sub-blocks. In some embodiments, the plurality of control point motion vectors (CPMVs) can be obtained according to an affine merge mode or an affine AMVP mode as described above with reference to FIGS. 12A-12C, 13. In some embodiments, each sub-block can have a size of 4×4 pixels or 8×8 pixels.

At (S2320), first motion vectors (e.g. Affine MV set 0) can be determined for the sub-blocks, respectively, according to the CPMVs.

At (S2330), second motion vectors (e.g. Affine MV set 1) can be determined for the sub-blocks, respectively, according to the CPMVs. In some embodiments, at least a first motion vector for one of the sub-blocks being different from a second motion vector for the one of the sub-blocks.

In some embodiments, one affine MV set (e.g. Affine MV set 0) can be derived from the CPMVs according to the affine mode as MVs corresponding to a first relative position in each sub-block. In some embodiments, the other affine MV set (e.g. Affine MV set 1) can be derived from the CPMVs according to the affine mode as MVs corresponding to a second relative position in each sub-block. In some embodiments, the second relative position is a particular corner of each sub-block. In some embodiments, the first relative position and the second relative position are symmetric with respect to one of a vertical line, a horizontal line, and a diagonal line intersecting a center of each sub-block.

In at least one example, the first relative position is a center of a left edge of each sub-block, and the second relative position is a center of a right edge of each sub-block.

Moreover, instead of deriving the two sets of sub-block motion vectors according to two different relative positions POS1 and POS2, only one relative position is used. For example, one affine MV set (e.g. Affine MV set 0) can be derived from the CPMVs according to the affine mode as MVs corresponding to a predetermined relative position in each sub-block, such as a center of each sub-block. The other affine MV set (e.g. Affine MV set 1) can be determined by processing the Affine MV set 0. For example, the Affine MV set 1 can be obtained by applying a motion vector offset ΔMV to the Affine MV set 0.

At (S2340), a first set of predicted samples for the current block is obtained according to the first motion vectors and the corresponding sub-blocks. In some embodiments, the first set of predicted samples can be obtained by obtaining sub-block predicted data for each sub-block according to the first motion vectors, respectively.

At (S2350), a second set of predicted samples for the current block is obtained according to the second motion vectors and the corresponding sub-blocks. In some embodiments, the second set of predicted samples can be obtained by obtaining predicted data for each sub-block according to the second motion vectors, respectively.

At (S2360), a third set of predicted samples for the current block can be obtained according to a combination of the first set of predicted samples and the second set of predicted samples. In some embodiments, the combination of the first set of predicted samples and the second set of predicted samples is calculated as a weighted average of the first set of predicted samples and the second set of predicted samples.

In one example, when a first pixel in the first set of predicted samples for a particular sub-block is located at a first position in the sub-block and has a first weight for calculating the combination, a second pixel in the first set of predicted samples for the particular sub-block is located at a second position in the sub-block and has a second weight for calculating the combination, and the first position is closer to the first relative position of the sub-block than the second position, the first weight can be greater than the second weight.

In one example, one of the sub-blocks has a size of 4×4 pixels, and a pixel in the first set of predicted samples for one of the sub-blocks has (1) a weight of three over a total weight of four when the pixel is located less than three pixels away from the first relative position along a horizontal direction or a vertical direction, and (2) a weight of one over the total weight of four when the pixel is located three or more pixels away from the first relative position along the horizontal direction or the vertical direction.

In some embodiments, weights for calculating the weighted average for a particular sub-block are derived according to a generalized bi-prediction (GBi) index for the particular sub-block.

In some embodiments, the current block is a uni-predicted block. In some embodiments, a de-blocking process is not performed on the current block.

In some embodiments, whether a stacked affine mode is enabled in a coding region of a particular level can be determined according to a flag signaled at the particular level, where the current block is included in the coding region of the particular level.

In some examples, the particular level corresponds to one of a slice, title, title-group, picture, and sequence level. In some examples, the determining the second motion vectors for the sub-blocks (S2330) and the obtaining the second set of predicted samples for the current block (S2350) are performed when the stacked affine mode is enabled. In one example, the determining the second motion vectors for the sub-blocks (S2330) and the obtaining the second set of predicted samples for the current block (S2350) are not performed when the stacked affine mode is not enabled.

In some examples, when the flag that is applicable to the coding region indicates that the stacked affine mode is enabled, the determining the second motion vectors for the sub-blocks (S2330) and the obtaining the second set of predicted samples for the current block (S2350) are not performed on any bi-predicted block in the coding region.

After (S2360), the process (2300) may proceed to (S2399) and terminate.

The embodiments described herein may be used separately or combined in any order. Further, each of the embodiments, encoder, and decoder may be implemented by processing circuitry (e.g., one or more processors or one or more integrated circuits). In one example, the one or more processors execute a program that is stored in a non-transitory computer-readable medium.

V. Computer System

The techniques described above, can be implemented as computer software using computer-readable instructions and physically stored in one or more computer-readable media. For example, FIG. 24 shows a computer system (2400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 24:
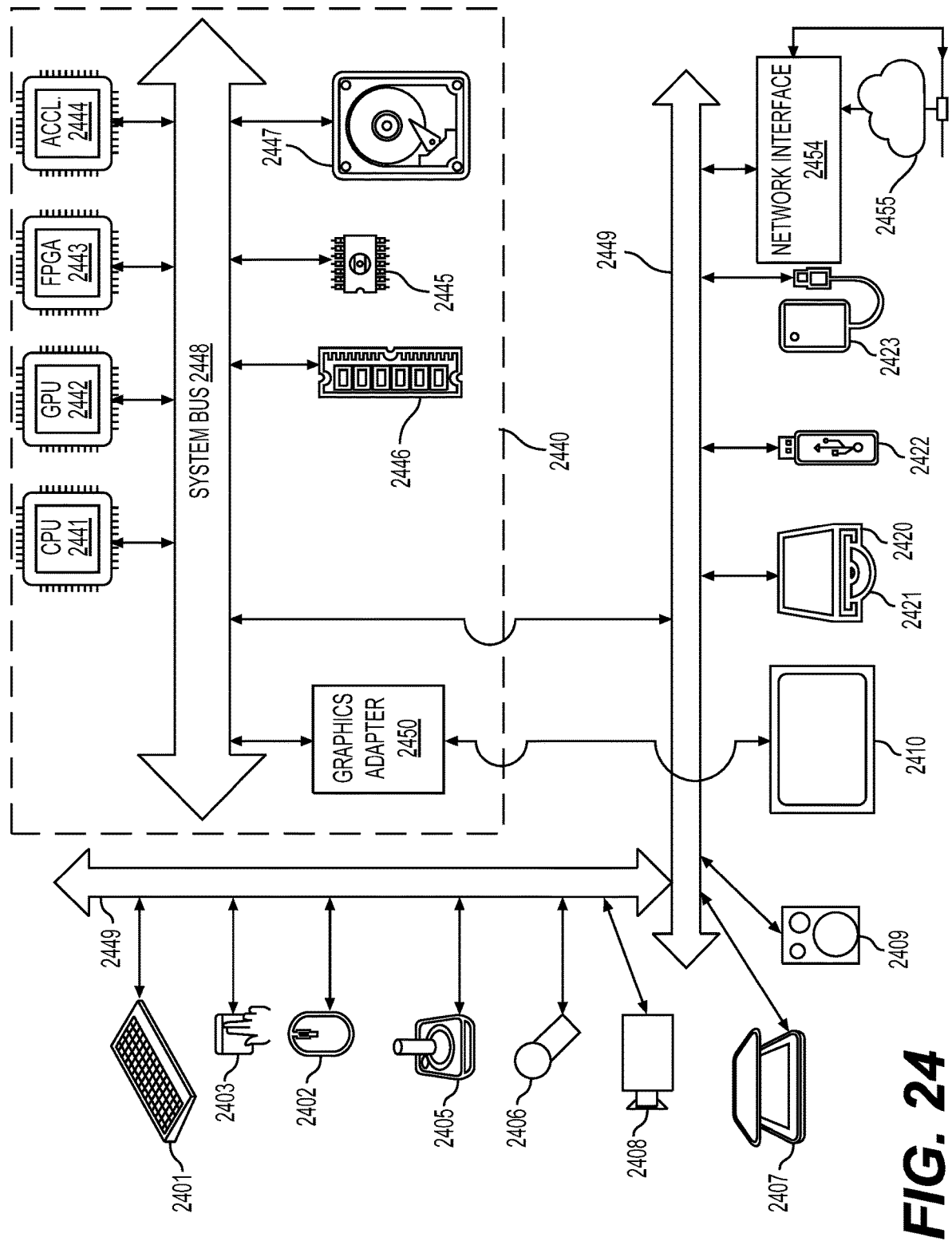
FIG. 24 is a schematic illustration of a computer system in accordance with an embodiment.

The components shown in FIG. 24 for computer system (2400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2400).

Computer system (2400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2401), mouse (2402), trackpad (2403), touch screen (2410), data-glove (not shown), joystick (2405), microphone (2406), scanner (2407), camera (2408).

Computer system (2400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2410), data-glove (not shown), or joystick (2405), but there can also be tactile feedback devices that do not serve as input devices), audio output devices (such as: speakers (2409), headphones (not depicted)), visual output devices (such as screens (2410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2400) can also include human accessible storage devices and their associated media such as optical media including CD/DVD ROM/RW (2420) with CD/DVD or the like media (2421), thumb-drive (2422), removable hard drive or solid state drive (2423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2400) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2449) (such as, for example USB ports of the computer system (2400)); others are commonly integrated into the core of the computer system (2400) by attachment to a system bus as described below (for example Ethernet interface into a PC computer system or cellular network interface into a smartphone computer system). Using any of these networks, computer system (2400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2440) of the computer system (2400).

The core (2440) can include one or more Central Processing Units (CPU) (2441), Graphics Processing Units (GPU) (2442), specialized programmable processing units in the form of Field Programmable Gate Areas (FPGA) (2443), hardware accelerators for certain tasks (2444), and so forth. These devices, along with Read-only memory (ROM) (2445), Random-access memory (2446), internal mass storage such as internal non-user accessible hard drives, SSDs, and the like (2447), may be connected through a system bus (2448). In some computer systems, the system bus (2448) can be accessible in the form of one or more physical plugs to enable extensions by additional CPUs, GPU, and the like. The peripheral devices can be attached either directly to the core's system bus (2448), or through a peripheral bus (2449). Architectures for a peripheral bus include PCI, USB, and the like.

CPUs (2441), GPUs (2442), FPGAs (2443), and accelerators (2444) can execute certain instructions that, in combination, can make up the aforementioned computer code. That computer code can be stored in ROM (2445) or RAM (2446). Transitional data can be also be stored in RAM (2446), whereas permanent data can be stored for example, in the internal mass storage (2447). Fast storage and retrieve to any of the memory devices can be enabled through the use of cache memory, that can be closely associated with one or more CPU (2441), GPU (2442), mass storage (2447), ROM (2445), RAM (2446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2400), and specifically the core (2440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2440) that are of non-transitory nature, such as core-internal mass storage (2447) or ROM (2445). The software implementing various embodiments of the present disclosure can be stored in such devices and executed by core (2440). A computer-readable medium can include one or more memory devices or chips, according to particular needs. The software can cause the core (2440) and specifically the processors therein (including CPU, GPU, FPGA, and the like) to execute particular processes or particular parts of particular processes described herein, including defining data structures stored in RAM (2446) and modifying such data structures according to the processes defined by the software. In addition or as an alternative, the computer system can provide functionality as a result of logic hardwired or otherwise embodied in a circuit (for example: accelerator (2444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

AMVP: Advanced Motion Vector Prediction
ASIC: Application-Specific Integrated Circuit
BMS: Benchmark Set
CANBus: Controller Area Network Bus
CD: Compact Disc
CPMV: Control Point Motion Vector
CPUs: Central Processing Units
CRT: Cathode Ray Tube
CTUs: Coding Tree Units
CU: Coding Unit
DVD: Digital Video Disc
FPGA: Field Programmable Gate Areas
GBi: Generalized Bi-prediction
GOPs: Groups of Pictures
GPUs: Graphics Processing Units
GSM: Global System for Mobile communications
HEVC: High Efficiency Video Coding
HMVP: History-based Motion Vector Prediction
HRD: Hypothetical Reference Decoder
IC: Integrated Circuit
JEM: Joint Exploration Model
LAN: Local Area Network
LCD: Liquid-Crystal Display
LTE: Long-Term Evolution
MMVD: Merge with MVD
MV: Motion Vector
MVD: Motion Vector Difference
MVP: Motion Vector Predictor
OLED: Organic Light-Emitting Diode
PBs: Prediction Blocks
PCI: Peripheral Component Interconnect
PLD: Programmable Logic Device
PUs: Prediction Units RAM: Random Access Memory
ROM: Read-Only Memory
SEI: Supplementary Enhancement Information
SNR: Signal Noise Ratio
SSD: Solid-State Drive
SPS: Sequence Parameter Set
SbTMVP: Subblock-based Temporal Motion Vector Prediction
TMVP: Temporal Motion Vector Prediction
TUs: Transform Units,
USB: Universal Serial Bus
VTM: Versatile Test Model
VUI: Video Usability Information
VVC: Versatile Video Coding While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding in a decoder, comprising:
determining first motion vectors for a plurality of subblocks of a current block based on a first relative position in each subblock of the plurality of subblocks;
determining second motion vectors for the plurality of subblocks based on a second relative position in each subblock of the plurality of subblocks;
obtaining a first set of predicted samples for the current block based on the first motion vectors of the plurality of subblocks;
obtaining a second set of predicted samples for the current block based on the second motion vectors of the plurality of subblocks; and
obtaining a third set of predicted samples for the current block based on a weighted average of the first set of predicted samples and the second set of predicted samples, wherein
the weighted average of the first set of predicted samples and the second set of predicted samples is calculated by applying a first weight to a pixel in the first set of predicted samples for the one of the plurality of subblocks, and
the first weight is ¾ based on the pixel being located less than three pixels away from the first relative position along a horizontal direction or a vertical direction, and
the first weight is ¼ based on the pixel being located three or more pixels away from the first relative position along the horizontal direction or the vertical direction.

2. The method of claim 1, wherein
the first motion vectors for the plurality of subblocks are determined based on a plurality of control point motion vectors of the current block, and
the second motion vectors for the plurality of subblocks are determined based on the plurality of control point motion vectors of the current block.

3. The method of claim 1, wherein the first relative position is a center of each subblock.

4. The method of claim 3, wherein the second relative position is a corner of each subblock.

5. The method of claim 1, wherein the first relative position and the second relative position of each subblock are symmetric with respect to one of a vertical line, a horizontal line, and a diagonal line intersecting a center of the respective subblock.

6. The method of claim 1, wherein
the first relative position is a center of a first edge of each subblock, and
the second relative position is a center of a second edge of each subblock.

7. The method of claim 1, wherein
a first pixel in the first set of predicted samples for one of the subblocks is located at a first position in the one of the subblocks,
a second pixel in the first set of predicted samples for the one of the subblocks is located at a second position in the one of the subblocks,
the first position is closer to the first relative position of the one of the subblocks than the second position, and
the weighted average of the first set of predicted samples and the second set of predicted samples is calculated by applying the first weight to the first pixel and a second weight to the second pixel, and the first weight being greater than the second weight.

8. The method of claim 1, wherein
the weighted average of the first set of predicted samples and the second set of predicted samples is calculated by applying weights for one of the plurality of subblocks that are derived according to a bi-prediction index that is a generalized bi-prediction (GBi) index for the one of the subblocks.

9. The method of claim 1, wherein
the current block is a uni-predicted block.

10. The method of claim 1, wherein
a de-blocking process is not performed on the current block.

11. The method of claim 1, further comprising:
determining whether a stacked affine mode is enabled for the current block according to a flag, wherein
the determining the second motion vectors for the plurality of subblocks, the obtaining the second set of predicted samples for the current block, and the obtaining the third set of predicted samples are performed based on the stacked affine mode being enabled, and
the determining the second motion vectors for the plurality of subblocks, the obtaining the second set of predicted samples for the current block, and the obtaining the third set of predicted samples are not performed based on the stacked affine mode not being enabled.

12. The method of claim 11, wherein
the flag indicates that the stacked affine mode is enabled, and
the determining the second motion vectors for the plurality of subblocks, the obtaining the second set of predicted samples for the current block, and the obtaining the third set of predicted samples are not performed on any bi-predicted block.

13. An apparatus, comprising:
processing circuitry configured to:
determine first motion vectors for a plurality of subblocks of a current block based on a first relative position in each subblock of the plurality of subblocks;
determine second motion vectors for the plurality of subblocks based on a second relative position in each subblock of the plurality of subblocks;
obtain a first set of predicted samples for the current block based on the first motion vectors of the plurality of subblocks;
obtain a second set of predicted samples for the current block based on the second motion vectors of the plurality of subblocks; and obtain a third set of predicted samples for the current block based on a weighted average of the first set of predicted samples and the second set of predicted samples, wherein the weighted average of the first set of predicted samples and the second set of predicted samples is calculated by applying a first weight to a pixel in the first set of predicted samples for the one of the plurality of subblocks, and the first weight is ¾ based on the pixel being located less than three pixels away from the first relative position along a horizontal direction or a vertical direction, and the first weight is ¼ based on the pixel being located three or more pixels away from the first relative position along the horizontal direction or the vertical direction.

14. The apparatus of claim 13, wherein the first relative position is a center of each subblock.

15. The apparatus of claim 13, wherein the first relative position is a center of a first edge of each subblock, and the second relative position is a center of a second edge of each subblock.

16. The apparatus of claim 13, wherein a first pixel in the first set of predicted samples for one of the subblocks is located at a first position in the one of the subblocks, a second pixel in the first set of predicted samples for the one of the subblocks is located at a second position in the one of the subblocks, the first position is closer to the first relative position of the one of the subblocks than the second position, and the weighted average of the first set of predicted samples and the second set of predicted samples is calculated by applying the first weight to the first pixel and a second weight to the second pixel, and the first weight being greater than the second weight.

17. A non-transitory computer-readable medium storing instructions which when executed by a computer for video decoding cause the computer to perform:

determining first motion vectors for a plurality of subblocks of a current block based on a first relative position in each subblock of the plurality of subblocks;

determining second motion vectors for the plurality of subblocks based on a second relative position in each subblock of the plurality of subblocks;

obtaining a first set of predicted samples for the current block based on the first motion vectors of the plurality of subblocks;

obtaining a second set of predicted samples for the current block based on a weighted average of the second motion vectors of the plurality of subblocks; and obtaining a third set of predicted samples for the current block based on the first set of predicted samples and the second set of predicted samples, wherein the weighted average of the first set of predicted samples and the second set of predicted samples is calculated by applying a first weight to a pixel in the first set of predicted samples for the one of the plurality of subblocks, and the first weight is ¾ based on the pixel being located less than three pixels away from the first relative position along a horizontal direction or a vertical direction, and the first weight is ¼ based on the pixel being located three or more pixels away from the first relative position along the horizontal direction or the vertical direction.

18. The non-transitory computer-readable medium of claim 17, wherein the first relative position is a center of each subblock.

* * * * *